United States Patent
Abe et al.

(10) Patent No.: US 9,922,748 B2
(45) Date of Patent: Mar. 20, 2018

(54) ELECTROCONDUCTIVE POLYETHYLENE RESIN COMPOSITION, AND MOLDED ARTICLE AND LAMINATE USING THE SAME

(71) Applicant: JAPAN POLYETHYLENE CORPORATION, Chiyoda-ku (JP)

(72) Inventors: Kazunari Abe, Kanagawa (JP); Haruo Ikeda, Kanagawa (JP)

(73) Assignee: JAPAN POLYETHYLENE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/033,470

(22) PCT Filed: Oct. 29, 2014

(86) PCT No.: PCT/JP2014/078798
§ 371 (c)(1),
(2) Date: Apr. 29, 2016

(87) PCT Pub. No.: WO2015/064652
PCT Pub. Date: May 7, 2015

(65) Prior Publication Data
US 2016/0284435 A1      Sep. 29, 2016

(30) Foreign Application Priority Data

Oct. 30, 2013 (JP) ................... 2013-225663
Mar. 3, 2014 (JP) ................... 2014-040582

(51) Int. Cl.
| | | |
|---|---|---|
| *E04F 13/02* | (2006.01) | |
| *C04B 26/00* | (2006.01) | |
| *H01B 1/24* | (2006.01) | |
| *B32B 27/32* | (2006.01) | |
| *C08L 23/06* | (2006.01) | |
| *C08L 23/26* | (2006.01) | |
| *B32B 27/06* | (2006.01) | |
| *B32B 27/20* | (2006.01) | |

(52) U.S. Cl.
CPC ............... *H01B 1/24* (2013.01); *B32B 27/06* (2013.01); *B32B 27/20* (2013.01); *B32B 27/32* (2013.01); *B32B 27/327* (2013.01); *C08L 23/06* (2013.01); *C08L 23/26* (2013.01); *B32B 2250/02* (2013.01); *B32B 2307/202* (2013.01); *B32B 2307/21* (2013.01); *B32B 2439/00* (2013.01); *B32B 2439/70* (2013.01); *B32B 2457/00* (2013.01); *B32B 2553/00* (2013.01); *C08K 2201/001* (2013.01); *C08L 2205/025* (2013.01); *C08L 2207/062* (2013.01); *C08L 2207/066* (2013.01); *C08L 2314/06* (2013.01)

(58) Field of Classification Search
CPC ........... H01B 1/24; B23B 27/06; B23B 27/20; B23B 27/32; B23B 27/327; B23B 2250/02; B23B 2307/202; B23B 2307/21; B23B 2439/00; B23B 2439/70; B23B 2553/00; C08L 23/06; C08L 23/26; C08L 2205/025; C08L 2207/062; C08K 2201/001
USPC ......................................................... 252/500
See application file for complete search history.

(56) References Cited

U.S. PATENT DOCUMENTS

2007/0292665 A1* 12/2007 Fukunaga ............... B32B 27/10
                                                                428/200
2012/0276377 A1* 11/2012 Masayuki .............. C09J 7/0271
                                                                428/347

FOREIGN PATENT DOCUMENTS

| JP | 50-4144 A | 1/1975 |
|---|---|---|
| JP | 60-139724 A | 7/1985 |
| JP | 62-48748 A | 3/1987 |
| JP | 62-168900 A | 7/1987 |
| JP | 63-132981 A | 6/1988 |
| JP | 64-164 A | 1/1989 |
| JP | S64164 A * | 1/1989 |
| JP | 3-229713 A | 10/1991 |
| JP | 4-277561 A | 10/1992 |
| JP | 8-259746 A | 10/1996 |
| JP | 8-279310 A | 10/1996 |
| JP | 2572711 B2 | 1/1997 |
| JP | 2792982 B2 | 9/1998 |
| JP | 2001-93333 A | 4/2001 |
| JP | 2002-241554 A | 3/2002 |
| JP | 2002-313137 A | 10/2002 |
| JP | 2003-277559 A | 10/2003 |
| JP | 2003-308590 A | 10/2003 |
| JP | 2004-35621 A | 2/2004 |

(Continued)

OTHER PUBLICATIONS

AkzoNobel. Ketjenblack EC-300J. Jan. 2017. Total pp. 2.*

(Continued)

*Primary Examiner* — Harold Pyon
*Assistant Examiner* — Danny N Kang
(74) *Attorney, Agent, or Firm* — Oblon, McClelland, Maier & Neustadt, L.L.P.

(57) ABSTRACT

An electroconductive polyethylene resin composition comprises: a resin component comprising a polar-group-containing polyethylene resin (A) and a polyethylene resin (B); and an electroconductive filler (E) incorporated into the resin component, wherein each of the proportions of the polar-group-containing polyethylene resin (A) and the polyethylene resin (B) in the resin component is the polar-group-containing polyethylene resin (A): 0.5 wt %-80 wt % and the polyethylene resin (B): 99.5 wt %-20 wt %, and the electroconductive polyethylene resin composition satisfies the following requirement (1): (1) surface resistivity: $10\Omega/\square$-$10^{10}\Omega/\square$.

16 Claims, No Drawings

(56) References Cited

FOREIGN PATENT DOCUMENTS

| JP | 2004-35622 | A | 2/2004 |
| JP | 2004-83887 | A | 3/2004 |
| JP | 2006-32395 | A | 2/2006 |
| JP | 2011-195756 | A | 10/2014 |

OTHER PUBLICATIONS

AkzoNobel. Ketjenblack EC-600JD. Jan. 2017. Total pp. 2.*
International Search Report dated Jan. 27, 2015 in PCT/JP2014/078798 Filed Oct. 29, 2014.
Combined Office Action and Search Report dated Mar. 2, 2017 in Chinese Patent Application No. 201480060055.X (with English translation of Office Action and English translation of categories of cited documents).
Office Action dated Oct. 10, 2017 in Japanese Patent Application No. 2014-220209 (with English language translation).
Office Action dated Sep. 19, 2017 in Chinese Patent Application No. 201480060055.X (with English language translation).

* cited by examiner

ELECTROCONDUCTIVE POLYETHYLENE RESIN COMPOSITION, AND MOLDED ARTICLE AND LAMINATE USING THE SAME

TECHNICAL FIELD

The present invention relates to an electroconductive polyethylene resin composition which combines an electrical conductivity, adhesiveness to highly polar materials, mechanical properties and moldability, and is excellent especially in terms of creep resistance. More particularly, the invention relates to an electroconductive polyethylene resin composition which has excellent properties that render the polyethylene resin composition suitable for use in producing a laminate including the composition that electrical conductivity has been imparted, and an adherend by various molding techniques.

The polyethylene resin composition of the invention is given non-charging property due to the electrical conductivity thereof. The invention further relates to a molded article and a laminate which take advantage of the feature of having non-charging property.

BACKGROUND ART

Polyethylene resins have high mechanical strength, are excellent in terms of chemical resistance, corrosion resistance, etc., are inexpensive, have satisfactory moldability, and are capable of conforming to environmental issues and resource recycling. Polyethylene resins are hence in extensive use as various household materials and industrial materials. For example, the resins are used in a variety of applications including products molded or formed by injection molding, extrusion molding, blow molding, etc., such as plastic bags supplied by stores on purchase, packaging materials for foods, films for agricultural uses, tubular molded articles, e.g., pipes and hoses, and containers for shampoos, liquid detergents, and edible oils.

However, polyethylene resins are prone to be electrostatically charged since the resins have no polar groups in the molecular structure. There are hence cases where molded articles of polyethylene resins, when rubbed, exposed to flows of organic solvents, etc., or placed in low-humidity environments, suffer surface charging to attract dust or soot, resulting in product surface fouling.

Techniques in which an electroconductive carbon filler or the like is added to a polyethylene resin for the purpose of imparting electrical conductivity thereto have been proposed so far. However, there is a problem in that the addition of electroconductive fillers to polyethylene resins results in decreases in mechanical property and flowability.

Polyolefin resin compositions to which electrical conductivity has been imparted by adding an electroconductive carbon filler to the polyolefin resins and processes for the production thereof have been proposed, for example, in patent document 1 to patent document 5.

Meanwhile, since polyethylene resins have no polar groups, production of layered structures using a polyethylene resin in combination with a material of a different kind, such as a synthetic resin having polar groups, a metal, or wood, encounters a problem in that adhesion between the two is exceedingly weak or the polyethylene resin does not adhere to the adherend.

Techniques for improving the extremely low adhesiveness of polyethylene resins have been disclosed. Examples thereof include: a method in which an unsaturated carboxylic acid or the like is caused to add to a high-pressure-process low-density polyethylene resin or a polyethylene resin produced by the medium- or low-pressure process, thereby imparting adhesiveness thereto (see, for example, patent document 6); and a method in which ethylene is copolymerized with a polar-group-containing vinyl monomer using a high-pressure radical polymerization process to obtain an olefin copolymer containing polar groups (see, for example, patent document 7 and patent document 8).

Although there is a desire for a polyethylene resin material in which the charging properties and the poor adhesiveness to different kinds of materials, which are drawbacks of polyethylene resins, have been improved and which retains the excellent properties originally possessed by polyethylene resins, it has been impossible to produce such a material with any prior-art technique.

Patent document 9 proposes, as a polyolefin resin which combines electrical conductivity and adhesiveness, a polypropylene resin composition obtained by compounding a polypropylene resin having specific properties with a modified polypropylene in which polar groups derived from maleic anhydride or the like have been introduced into the molecular chain and with electroconductive carbon.

Patent document 10 proposes a semiconducting mixture which exhibits excellent performance when used in PTC elements, the semiconducting mixture being obtained by adding two carbon blacks each having a specific property range to high-density polyethylene having molecular chain terminals modified with an acid anhydride, and further proposes a PTC element.

PRIOR ART DOCUMENTS

Patent Documents

Patent Document 1: JP-A-2002-313137
Patent Document 2: JP-A-2004-35622
Patent Document 3: JP-A-2004-35621
Patent Document 4: JP-A-08-279310
Patent Document 5: Japanese Patent No. 2572711
Patent Document 6: JP-A-50-004144
Patent Document 7: Japanese Patent No. 2792982
Patent Document 8: JP-A-3-229713
Patent Document 9: JP-A-2004-83887
Patent Document 10: JP-A-2002-241554

SUMMARY OF THE INVENTION

Problems that the Invention is to Solve

According to the method described in patent document 9, it is possible to produce an electroconductive polypropylene resin composition which is excellent in terms of coatability, in particular, electrostatic coatability, and further has excellent properties. However, the property of being poor in impact resistance in low-temperature environments, which is characteristic of polypropylene resins, cannot be mitigated therewith, and applications of the composition are hence limited. Furthermore, patent document 9 neither indicates application of the method to a polyethylene resin, nor mentions adhesiveness to different kinds of materials.

Meanwhile, according to the method described in patent document 10, it is possible to produce a semiconducting mixture for PTC elements which has a large ratio between ordinary-temperature electrical resistance and high-temperature electrical resistance and which shows excellent adhesiveness to metal foils. However, since the high-density polyethylene having molecular chain terminals modified with an acid anhydride is used as the only polymer, the mixture is not always sufficient in adhesiveness to different kinds of materials, impact resistance, and creep resistance. Furthermore, patent document 10 does not indicate use of the mixture to applications other than PTC elements.

Under such circumstances, it is desired to propose an electroconductive polyethylene resin composition that includes a polyethylene resin to which electrical conductivity and adhesiveness to different kinds of materials have been imparted and that is excellent especially in terms of creep resistance and retains the excellent properties originally possessed by polyethylene resins.

An object of the invention, in view of the conventional problems of background-art techniques described above, is to provide an electroconductive polyethylene resin composition which is excellent in terms of electrical conductivity and adhesiveness to highly polar materials of different kinds and which further has the excellent properties possessed by polyethylene resins, and to provide a laminate and a molded article each obtained using the composition.

Means for Solving the Problems

The present inventors diligently made investigations in order to overcome the problems described above. As a result, the inventors have discovered that an electroconductive polyethylene resin composition which combines electrical conductivity and adhesiveness to different kinds of materials and which further has the excellent properties possessed by polyethylene resins is obtained in cases when the resin composition is configured of a polar-group-containing polyethylene resin having a specific property range, a polyethylene resin having no polar groups, and an electroconductive filler having a specific value of BET specific surface area.

The inventors have further discovered that an electroconductive polyethylene resin composition which combines electrical conductivity and adhesiveness to different kinds of materials and has excellent creep resistance is obtained in cases when the resin composition is configured of a polar-group-containing polyethylene resin having a specific property range, a polyethylene resin produced by polymerization using a metallocene-based catalyst, the other polyethylene resin, which is added according to need, and an electroconductive filler having a specific value of BET specific surface area. The present invention has been thus achieved.

The present invention provides, as a basic invention (first invention), an electroconductive polyethylene resin composition comprising: a resin component comprising a polar-group-containing polyethylene resin (A) and a polyethylene resin (B); and an electroconductive filler (E) incorporated into the resin component, wherein the proportions of the polar-group-containing polyethylene resin (A) and the polyethylene resin (B) in the resin component are as follows:
Polar-group-containing polyethylene resin (A): 0.5 wt %-80 wt %
Polyethylene resin (B): 99.5 wt %-20 wt %,
and the electroconductive polyethylene resin composition satisfies the following requirement (1):
(1) surface resistivity: 10 Ω/□-$10^{10}$ Ω/□.

The basic invention of the present invention involves embodiment inventions, which are second and succeeding inventions enumerated below in order. A second invention is the electroconductive polyethylene resin composition according to the first invention, which comprises the electroconductive filler (E) in an amount of 6-30 parts by weight per 100 parts by weight of the total amount of the resin component comprising a polar-group-containing polyethylene resin (A) and a polyethylene resin (B).

A third invention of the present invention is the electroconductive polyethylene resin composition according to the first or second invention, wherein the electroconductive filler (E) has a BET specific surface area of 50 $m^2$/g-1,600 $m^2$/g.

A fourth invention of the present invention is the electroconductive polyethylene resin composition according to any one of the first to third inventions, which satisfies the following requirements (2) and (3):
(2) a rupture time, as measured through a full-notch tensile creep test, is 10 hours or longer,
(3) an adhesive strength is 8 N/mm or higher.

A fifth invention of the present invention is the electroconductive polyethylene resin composition according to any one of the first to fourth inventions, wherein the polyethylene resin (B) comprises a polyethylene resin (C) produced by polymerization using a metallocene-based catalyst and the other polyethylene resin (D).

A sixth invention of the present invention is the electroconductive polyethylene resin composition according to any one of the first to fifth inventions, wherein the resin component comprising a polar-group-containing polyethylene resin (A) and a polyethylene resin (B) comprises the polar-group-containing polyethylene resin (A), the polyethylene resin (C) produced by polymerization using a metallocene-based catalyst, and the other polyethylene resin (D), and the proportions of the polar-group-containing polyethylene resin (A), the polyethylene resin (C) produced by polymerization using a metallocene-based catalyst, and the other polyethylene resin (D) are as follows:
Polar-group-containing polyethylene resin (A): 0.5 wt %-80 wt %
Polyethylene resin (C) produced by polymerization using a metallocene-based catalyst: 5 wt %-75 wt %
Other polyethylene resin (D): 0 wt %-94.5 wt %.

A seventh invention of the present invention is the electroconductive polyethylene resin composition according to any one of the first to sixth inventions, wherein the electroconductive filler (E) has a BET specific surface area of 500 $m^2$/g-1,600 $m^2$/g.

An eighth invention of the present invention is the electroconductive polyethylene resin composition according to any one of the first to seventh inventions, wherein the polar group contained in the polar-group-containing polyethylene resin (A) are selected from the group consisting of carboxyl group, dicarboxylic acid anhydride group, amino group, ester group, silanol group and glycidyl group.

A ninth invention of the present invention is the electroconductive polyethylene resin composition according to any one of the first to eighth inventions, wherein the polar-group-containing polyethylene resin (A) satisfies the following requirements (A1) and (A2):
(A1) Melt flow rate (MFR) measured at a temperature of 190° C. under a load of 2.16 kg: 0.01 g/min-100 g/min
(A2) Density: 0.860 g/$cm^3$-0.970 g/$cm^3$.

A tenth invention of the present invention is the electroconductive polyethylene resin composition according to the fifth invention, wherein the polyethylene resin (C) produced with a metallocene-based catalyst satisfies the following requirements (C1) to (C3):
(C1) Melt flow rate (MFR) measured at a temperature of 190° C. under a load of 2.16 kg: 0.01 g/min-50 g/min
(C2) Density: 0.860 g/$cm^3$-0.930 g/$cm^3$ (C3) Molecular-weight distribution parameter (Mw/Mn): 1.0-4.0.

An eleventh invention of the present invention is the electroconductive polyethylene resin composition according to any one of the first to tenth inventions, which satisfies the following requirement (4):

(4) High-load melt flow rate (HL-MFR) measured at a temperature of 190° C. under a load of 21.6 kg: 1.0-100 g/min.

A twelfth invention of the present invention is the electroconductive polyethylene resin composition according to any one of the first to eleventh inventions, which satisfies the following requirement (5):

(5) Density: 0.930-1.150 g/cm$^3$.

A thirteenth invention of the present invention is a molded article obtained by molding the electroconductive polyethylene resin composition according to any one of the first to twelfth inventions.

A fourteenth invention of the present invention is a laminate comprising a layer of the electroconductive polyethylene resin composition according to any one of the first to twelfth inventions and an adherend layer.

A fifteenth invention of the present invention is the molded article according to the thirteenth inventions, which is a non-charging molded article.

A sixteenth invention of the present invention is the laminate according to the fourteenth invention, which is a non-charging laminate.

Effects of the Invention

The electroconductive polyethylene resin composition of the present invention includes a polar-group-containing polyethylene resin having a specific property range, a polyethylene resin having no polar groups, and an electroconductive filler having a specific value of BET specific surface area, has electrical conductivity imparted to the polyethylene resins, shows high adhesiveness to adherends, and has rendered production of useful laminates possible.

The electroconductive polyethylene resin composition of the present invention may be an electroconductive polyethylene resin composition which includes a polar-group-containing polyethylene resin having a specific property range, a polyethylene resin produced by polymerization using a metallocene-based catalyst, and an electroconductive filler having a specific value of BET specific surface area and which optionally further includes the other polyethylene resin having no polar groups, and this resin composition shows electrical conductivity and high adhesiveness to adherends and further has excellent creep resistance. These remarkable effects have been demonstrated by comparisons in data between the Examples according to the invention and Comparative Examples which will be given later.

MODES FOR CARRYING OUT THE INVENTION

[1] Polar-Group-Containing Polyethylene Resin (A)
(1) Polar-Group-Containing Polyethylene Resin The polar-group-containing polyethylene resin (A) according to the invention is a polyethylene resin in which the molecular chain contains polar groups.

Examples of processes for producing the polar-group-containing polyethylene resin (A) include: a method in which a polyethylene resin is graft-modified with a polar-group-containing monomer; a method in which the vinyl group moieties of a polyethylene resin having vinyl groups are chemically modified; a method in which a high-pressure radical polymerization process is used to copolymerize ethylene with a polar-group-containing monomer, and a method in which ethylene is copolymerized with a polar-group-containing monomer in the presence of a transition metal catalyst. Although the production processes are not limited to these examples, use can be suitably made of the methods disclosed in, for example, JP-A-50-4144, Japanese Patent No. 2792982, JP-A-3-229713, JP-A-2005-97587, JP-A-2005-97588, JP-A-2006-131707, JP-A-2009-155655, JP-A-2009-155656, and JP-A-2013-147644.

(2) Polar Groups

The polar groups to be contained in the polar-group-containing polyethylene resin (A) according to the invention can be any of known polar groups without limitations. Preferred examples thereof include carboxyl group, dicarboxylic acid anhydride groups, amino groups, ester groups, silanol groups, and glycidyl group. More preferred are carboxyl group and dicarboxylic acid anhydride groups.

(3) Graft Modification

One example of methods for introducing polar groups into a polyethylene resin is graft modification. Methods for the graft modification are not limited. Known methods include, for example, a melt process in which a polyethylene resin which has been brought into a molten state with an extruder or the like is reacted with a polar-group-containing monomer using a reaction initiator and a solution process in which a polyethylene resin is dissolved in a solvent and reacted with a polar-group-containing monomer using a reaction initiator. Although either of these two processes is suitable for use, the melt process is more suitable from the standpoints of production cost and environmental burden.

In the case of introducing a polar-group-containing monomer into molecular chains of polyethylene by graft modification, a polyethylene resin is used as a raw material. Although the polyethylene resin to be used as a raw material can be the same as the polyethylene resin (B) which will be described later, this polyethylene resin may differ from the polyethylene resin (B) in MFR range or density range.

(3-1) Melt Process

One example of methods for producing the polar-group-containing polyethylene resin by the melt process among modification methods is shown below.

Melting/kneading devices usable for conducting the graft modification are not limited. However, use is generally made of a single-screw extruder, twin-screw extruder, kneader, Banbury mixer, Brabender, reciprocating kneading machine (BUSS KNEADER), or the like. Of these, use of a single-screw extruder of twin-screw extruder is more suitable from the standpoint of productivity.

(3-2) Reaction Initiator

Examples of the reaction initiator to be used for the graft modification according to the invention include free-radical initiators which decompose upon heating, etc. to generate radicals. Examples of the free-radical initiators include organic peroxides, dihydroaromatic compounds, and dicumyl compounds. Suitable for use as the organic peroxides are, for example, hydroperoxides, dicumyl peroxide, t-butylcumyl peroxide, dialkyl(allyl)peroxides, diisopropylbenzene hydroperoxide, dipropionyl peroxide, dioctanoyl peroxide, benzoyl peroxide, peroxysuccinic acid, peroxyketals, 2,5-dimethyl-2,5-di(t-butylperoxy)hexyne, 2,5-dimethyl-2,5-di(t-butylperoxy)hexane, t-butyl hydroxyacetate, and t-butyl peroxyisobutyrate.

Examples of the dihydroaromatic compounds include dihydroquinoline or derivatives thereof, dihydrofuran, 1,2-dihydrobenzene, 1,2-dihydronaphthalene, and 9,10-dihydrophenanthlene.

Examples of the dicumyl compounds include 2,3-dimethyl-2,3-diphenylbutane, 2,3-diethyl-2,3-diphenylbutane, 2,3-diethyl-2,3-di(p-methylphenyl)butane, and 2,3-diethyl-2,3-di(p-bromophenyl)butane. It is especially preferred to use 2,3-diethyl-2,3-diphenylbutane.

(3-3) Polar-Group-Containing Monomer

Examples of the polar-group-containing monomer to be used in the graft modification include (a) monomers containing a carboxylic acid group or acid anhydride group, (b) monomers containing an ester group, (c) monomers containing an amino group, (d) monomers containing a silane group, and (e) monomers containing a glycidyl group. More preferred are monomers (a) containing a carboxylic acid group or acid anhydride group.

Of these, monomers containing an acid anhydride group are suitable. One polar-group-containing monomer may be used, or two or more polar-group-containing monomers may be used.

Examples of the monomers (a) containing a carboxylic acid group or acid anhydride group include: unsaturated dicarboxylic acids such as maleic acid, fumaric acid, citraconic acid, itaconic acid, 2,7-octadien-1-ylsuccinic acid, and 5-norbornene-2,3-dicarboxylic acid and the anhydrides thereof; and unsaturated monocarboxylic acids such as acrylic acid, methacrylic acid, furoic acid, crotonic acid, vinyl acetate, and pentenoic acid. More preferred are maleic anhydride, 2,7-octadien-1-ylsuccinic anhydride, and 5-norbornene-2,3-dicarboxylic anhydride. Especially preferred is maleic anhydride.

Examples of the monomers (b) containing an ester group include methyl acrylate, methyl methacrylate, ethyl acrylate, ethyl methacrylate, butyl acrylate, and butyl methacrylate. Especially preferred examples thereof include methyl acrylate.

Examples of the monomers (c) containing an amino group include aminoethyl (meth)acrylate, dimethylaminoethyl (meth)acrylate, diethylaminoethyl (meth)acrylate, and cyclohexylaminoethyl (meth)acrylate.

Examples of the monomers (d) containing a silane group include unsaturated silane compounds such as vinyltrimethoxysilane, vinyltriethoxysilane, vinyltriacetylsilane, and vinyltrichlorosilane.

Examples of the monomers (e) containing a glycidyl group include 1,2-epoxy-9-decene, 4-hydroxybutyl acrylate glycidyl ether, glycidyl methacrylate, and 1,2-epoxy-4-vinylcyclohexane.

(3-4) Treatment Temperature for Graft Modification

A treatment temperature for the graft modification is suitably selected while taking account of the deterioration of the polyethylene resin, decomposition of the polar-group-containing monomer, decomposition temperature of the peroxide used, etc. However, in the case of the melt kneading method, for example, a suitable temperature is usually 190-350° C., in particular, 200-300° C.

In the case where a polyethylene resin is graft-modified with a polar-group-containing monomer by the melt kneading method shown above as an example, a high degree of monomer addition can be attained by regulating the resin temperature during the melt kneading to 250° C. or higher. Meanwhile, in case where the resin temperature exceeds 310° C., the deterioration of the polyethylene itself is accelerated and, hence, troubles such as gelation and resin scorching occur considerably, resulting in a decrease in quality.

Since the reaction is conducted at such a high temperature, it is necessary to minimize air inclusion into the inside of the extruder, reactor, or the like, and the resin in the melt kneading must be inhibited from residing in the extruder or the like for a prolonged period. It is therefore highly preferred to conduct nitrogen feeding in the vicinity of the raw-material resin introduction port.

In cases when the polar-group-containing polyethylene resin (A) according to the invention is produced by graft modification, it is not preferred to add additives such as antioxidants in general use. For example, in case where an antioxidant for polyolefins, such as a phenol, is added, there is a possibility that this antioxidant might compete with the reaction initiator, resulting in an increase in the amount of the unreacted polar-group-containing monomer.

(4) MFR of Polar-Group-Containing Polyethylene Resin (A)

The melt flow rate (MFR) of the polar-group-containing polyethylene resin (A) according to the invention, as measured at a temperature of 190° C. under a load of 2.16 kg, may be in the range of 0.01-100 g/10 min, preferably 0.01-50 g/10 min, more preferably 0.01-20 g/10 min, even more preferably 0.01-10 g/10 min. Such MFR range is suitable from the standpoints of adhesiveness to different kinds of materials and a balance among the properties of the electroconductive polyethylene resin composition. In case where the MFR thereof is less than 0.01 g/10 min, the composition has exceedingly low flowability and is difficult to mold by, for example, extrusion molding or injection molding. Meanwhile, in case where the MFR thereof exceeds 100 g/10 min, not only the composition is reduced in impact resistance and creep resistance but also the adhesiveness thereof to different kinds of materials is adversely affected.

(5) Density of Polar-Group-Containing Polyethylene Resin (A)

The density of the polar-group-containing polyethylene resin (A) according to the invention may be in the range of 0.860-0.970 g/cm$^3$, preferably 0.900-0.968 g/cm$^3$, more preferably 0.910-0.965 g/cm$^3$. Densities thereof less than 0.860 g/cm$^3$ lead to decreases in rigidity and adhesiveness, while densities thereof exceeding 0.970 g/cm$^3$ result in decreases in impact resistance and creep resistance.

(6) Polar-Group Content of Polar-Group-Containing Polyethylene Resin (A)

The amount of polar groups introduced into the polar-group-containing polyethylene resin (A) is generally in the range of 0.001-10.0% by weight, more preferably in the range of 0.01-5.0% by weight, even more preferably in the range of 0.02-3.0% by weight. In case where the amount of polar groups introduced into the polar-group-containing polyethylene resin (A) is less than 0.001% by weight, the adhesiveness to different kinds of materials is insufficient. In case where the amount thereof exceeds 10.0% by weight, this polar-group-containing polyethylene resin (A) not only shows reduced compatibility with polyethylene resins but also has reduced mechanical properties.

[2] Polyethylene Resin (B)

(1) Polyethylene Resin (B)

The polyethylene resin (B) according to the invention is either an ethylene homopolymer or an ethylene/α-olefin copolymer obtained by polymerizing ethylene and one or more monomers selected from among α-olefins having 3-20 carbon atoms. The polyethylene resin (B) may be one polyethylene resin, or two or more polyethylene resins may be used as the resin (B).

(2) Ethylene/α-olefin Copolymer

Examples of the α-olefins having 3-20 carbon atoms which can be subjected to polymerization for producing the ethylene/α-olefin copolymer according to the invention, which is obtained by copolymerizing ethylene with one or more monomers selected from among α-olefins having 3-20 carbon atoms, include propylene, 1-butene, 4-methyl-1-pentene, 1-hexene, 1-octene, and 1-dodecene. More preferred are propylene, 1-butene, 1-hexene, and 1-octene. One α-olefin having 3-20 carbon atoms may be copolymerized with ethylene, or two or more such α-olefins may be subjected to the copolymerization.

(3) Processes for Producing Polyethylene Resin (B)

Processes for producing the polyethylene resin (B) according to the invention are not particularly limited. Examples thereof include a high-pressure radical polymerization process, a high-, medium-, or low-pressure process in which a Ziegler, Phillips, or single-site catalyst is used, and other known processes. With respect to processes for producing the polyethylene resin (B), the resin (B) can be produced by various production processes described in, for example, JP-B-55-14084, JP-B-58-1708, JP-A-08-301933, JP-A-09-286820, JP-A-11-228635, JP-A-2003-064187, JP-A-2000-109521, JP-T-2003-519496 (the term "JP-T" as used herein means a published Japanese translation of a PCT patent application), JP-T-2003-504442, JP-T-2003-531233, JP-A-8-325333, JP-A-9-031263, JP-A-9-087440, JP-A-2006-265387, JP-A-2006-265388, JP-A-2006-282927, JP-T-2001-525457, JP-T-2004-531629, JP-A-2005-120385, JP-A-58-19309, JP-A-59-95292, JP-A-60-35005, JP-A-60-35006, JP-A-60-35007, JP-A-60-35008, JP-A-60-35009, JP-A-61-130314, JP-A-3-163088, European Patent Application Publication No. 420,436, U.S. Pat. No. 5,055,438, and International Publication WO 91/04257.

(4) MFR of Polyethylene Resin (B)

It is preferable that the melt flow rate (MFR) of the polyethylene resin (B) according to the invention, as measured at a temperature of 190° C. under a load of 2.16 kg, should be in the range of 0.01-50 g/10 min, preferably 0.05-30 g/10 min, more preferably 0.07-20 g/10 min. In case where the MFR thereof is less than 0.01 g/10 min, there is a possibility that the composition might show insufficient flowability during molding and have impaired molding stability. In case where the MFR thereof exceeds 50 g/10 min, the composition may be insufficient in mechanical property such as impact resistance and creep resistance.

(5) Density of Polyethylene Resin (B)

The density of the polyethylene resin (B) according to the invention may be in the range of 0.870-0.970 g/cm$^3$, preferably 0.880-0.968 g/cm$^3$, more preferably 0.900-0.965 g/cm$^3$. Densities thereof less than 0.870 g/cm$^3$ lead to decreases in rigidity, chemical resistance, and fuel oil resistance, while densities thereof exceeding 0.970 g/cm$^3$ result in insufficient mechanical properties such as impact resistance and creep resistance.

[3] Polyethylene Resin (C)

(1) Polyethylene Resin (C)

The polyethylene resin (C) according to the invention is an ethylene/α-olefin copolymer obtained by polymerizing ethylene and one or more monomers selected from among α-olefins having 3-20 carbon atoms, in the presence of a metallocene-based catalyst. For improving the creep resistance of the electroconductive polyethylene resin composition, it is useful to incorporate the polyethylene resin (C) in an increased amount. The polyethylene resin (C) may be one polyethylene resin, or two or more polyethylene resins may be used as the resin (C).

(2) α-Olefins to be subjected to Polymerization for producing Polyethylene Resin (C)

The α-olefins which can be subjected to polymerization for producing the polyethylene resin (C) according to the invention preferably are α-olefins having 3-20 carbon atoms. More preferred examples thereof include propylene, 1-butene, 4-methyl-1-pentene, 1-hexene, 1-octene, and 1-dodecene. More preferred are propylene, 1-butene, 1-hexene, and 1-octene. One α-olefin having 3-20 carbon atoms may be copolymerized with ethylene, or two or more such α-olefins may be subjected to the copolymerization.

(3) Processes for Producing Polyethylene Resin (C)

The polyethylene resin (C) according to the invention can be produced by a high-, medium-, or low-pressure process or the other known process in which a metallocene-based catalyst is used. The term "metallocene-based catalyst" according to the invention means a single-site catalyst capable of polyolefin production. Any known single-site catalyst capable of polyolefin production can be used without limitations. With respect to processes for producing the polyethylene resin (C) according to the invention, ethylene/α-olefin copolymers produced using a solid catalyst constituted of both a mixture system including single-site catalyst compounds and a promoter are disclosed in, for example, JP-A-8-325333, JP-A-9-031263, and JP-A-9-087440. Ethylene/α-olefin copolymers produced in a single reactor using a plurality of single-site catalysts are disclosed in JP-A-2006-265387, JP-A-2006-265388, and JP-A-2006-282927. As other examples, a bimodal ethylene/α-olefin copolymer obtained using a hafnium metallocene type catalyst is disclosed in JP-T-2001-525457, and an ethylene/α-olefin copolymer obtained using a single-site catalyst is disclosed in JP-T-2004-531629 and JP-A-2005-120385. Examples of copolymer production with other single-site catalysts are described in JP-A-58-19309, JP-A-59-95292, JP-A-60-35005, JP-A-60-35006, JP-A-60-35007, JP-A-60-35008, JP-A-60-35009, JP-A-61-130314, JP-A-3-163088, JP-A-2010-150246, JP-A-2010-202647, JP-A-2009-132898, JP-A-2010-260913, Japanese Patent No. 4524335, European Patent Application Publication No. 420,436, U.S. Pat. No. 5,055,438, International Publication WO 91/04257, etc., and these processes may be suitably used.

(4) MFR of Polyethylene Resin (C)

It is preferable that the melt flow rate (MFR) of the polyethylene resin (C) according to the invention, as measured at a temperature of 190° C. under a load of 2.16 kg, should be in the range of 0.01-50 g/10 min, preferably 0.05-30 g/10 min, more preferably 0.07-20 g/10 min. In case where the MFR thereof is less than 0.01 g/10 min, there is a possibility that the composition might show insufficient flowability during molding and have impaired molding stability. In case where the MFR thereof exceeds 50 g/10 min, the composition may be insufficient in mechanical property such as impact resistance and creep resistance.

(5) Density of Polyethylene Resin (C)

The density of the polyethylene resin (C) according to the invention may be in the range of 0.860-0.930 g/cm$^3$, preferably 0.865-0.925 g/cm$^3$, more preferably 0.867-0.922 g/cm$^3$. Densities thereof less than 0.860 g/cm$^3$ lead to decreases in rigidity, chemical resistance, and fuel oil resistance, while densities thereof exceeding 0.930 g/cm$^3$ result in insufficient creep resistance.

(6) Molecular-Weight Distribution Parameter (Mw/Mn) of Polyethylene Resin (C)

The molecular-weight distribution parameter (Mw/Mn) of the polyethylene resin (C) according to the invention may be in the range of 1.0-4.0, preferably 1.2-3.8, more preferably 1.4-3.6, even more preferably 1.5-3.5. In case where the Mw/Mn thereof is less than 1.0, the composition shows insufficient processability when molded by the molding techniques shown above. In case where the Mw/Mn thereof exceeds 4.0, the composition is poor in impact resistance and creep resistance.

[4] Other Polyethylene Resin (D)

(1) Polyethylene Resin (D)

The polyethylene resin (D) according to the invention is either an ethylene homopolymer or an ethylene/α-olefin copolymer obtained by polymerizing ethylene and one or more monomers selected from among α-olefins having 3-20 carbon atoms. The polyethylene resin (D) may be one polyethylene resin, or two or more polyethylene resins may be used as the resin (D).

The polyethylene resin (C) described above produced by polymerization in the presence of a single-site catalyst is excellent in terms of impact resistance and creep resistance but tends to be high in production cost, as compared with polyethylene resins produced by polymerization by other polymerization processes such as, for example, a high-pressure radical polymerization process and a process in which a Ziegler catalyst or a Phillips catalyst is used to conduct polymerization at a high, medium, or low pressure. Other polyethylene(s) (D) may be incorporated in an appropriate amount into the electroconductive polyethylene resin composition of the invention according to need so long as electrical conductivity, adhesiveness to highly polar materials of different kinds, and creep resistance are balanced, a balanced combination of these properties being in the spirit of the electroconductive polyethylene resin composition of the invention.

(2) α-Olefins to be Subjected to Polymerization for Producing Polyethylene Resin (D)

Examples of the α-olefins having 3-20 carbon atoms which can be subjected to polymerization for producing the polyethylene resin (D) according to the invention include propylene, 1-butene, 4-methyl-1-pentene, 1-hexene, 1-octene, and 1-dodecene. More preferred are propylene, 1-butene, 1-hexene, and 1-octene. One α-olefin having 3-20 carbon atoms may be copolymerized with ethylene, or two or more α-olefins may be subjected to the copolymerization.

(3) Processes for Producing Polyethylene Resin (D)

Processes for producing the polyethylene resin (D) according to the invention are not particularly limited. Examples thereof include a high-pressure radical polymerization process, a high-, medium-, or low-pressure process in which a Ziegler, Phillips, or the other catalyst is used, and other known processes. With respect to processes for producing the polyethylene resin (D), the resin (D) can be produced by various production processes described in, for example, JP-B-55-14084, JP-B-58-1708, JP-A-08-301933, JP-A-09-286820, JP-A-11-228635, JP-A-2003-064187, JP-A-2000-109521, JP-T-2003-519496, JP-T-2003-504442, JP-T-2003-531233, JP-A-8-325333, JP-A-9-031263, JP-A-9-087440, JP-A-2006-265387, JP-A-2006-265388, JP-A-2006-282927, JP-T-2001-525457, JP-T-2004-531629, JP-A-2005-120385, JP-A-58-19309, JP-A-59-95292, JP-A-60-35005, JP-A-60-35006, JP-A-60-35007, JP-A-60-35008, JP-A-60-35009, JP-A-61-130314, and JP-A-3-163088.

(4) MFR of Polyethylene Resin (D)

It is preferable that the melt flow rate (MFR) of the polyethylene resin (D) according to the invention, as measured at a temperature of 190° C. under a load of 2.16 kg, should be in the range of 0.001-200 g/10 min, preferably 0.01-100 g/10 min, more preferably 0.05-80 g/10 min, even more preferably 0.1-50 g/10 min. In case where the MFR thereof is less than 0.001 g/10 min, there is a possibility that the composition might show insufficient flowability during molding and have impaired molding stability. In case where the MFR thereof exceeds 200 g/10 min, the composition may be insufficient in mechanical property such as impact resistance and creep resistance.

(5) Density of Polyethylene Resin (D)

The density of the polyethylene resin (D) according to the invention may be in the range of 0.870-0.970 g/cm$^3$, preferably 0.875-0.968 g/cm$^3$, more preferably 0.880-0.965 g/cm$^3$. Densities thereof less than 0.870 g/cm$^3$ lead to decreases in rigidity, chemical resistance, and fuel oil resistance, while densities thereof exceeding 0.970 g/cm$^3$ result in insufficient mechanical properties such as impact resistance and creep resistance.

[5] Electroconductive Filler (E)

(1) Electroconductive Filler (E)

As the electroconductive filler (E) according to the invention, an electroconductive carbon filler can be used. Examples thereof include carbon blacks, carbon nanotubes, and carbon fibers. Preferred of these are carbon blacks. Examples of the carbon blacks, according to a classification based on raw material or production process, include acetylene black, gas black, oil black, naphthalene black, thermal black, furnace black, lamp black, channel black, roll black, and disk black. Preferred of these are ones intended to impart electrical conductivity, such as acetylene black, conductive furnace black, superconductive furnace black, conductive channel black, and furnace or channel black which has been heat-treated at a temperature as high as about 1,500° C. One of these electroconductive carbon materials may be used alone, or two or more thereof may be used in combination.

In one embodiment, the specific surface area of the electroconductive filler (E) according to the invention is in the range of 50-1,600 m$^2$/g, preferably 100-1,500 m$^2$/g, more preferably 200-1,450 m$^2$/g. Electroconductive carbon has a large specific surface area due to the numerous pores present therein, etc.; the larger the specific surface area, the better the efficiency of conductivity impartation. Furthermore, the larger the specific surface area, the smaller the addition amount in which electrical conductivity can be imparted. In case where the specific surface area thereof is less than 50 m$^2$/g, it is necessary to add the electroconductive filler in a large amount for imparting sufficient electrical conductivity, undesirably resulting in decreases in impact resistance and tensile elongation at rupture. In case where the specific surface area thereof exceeds 1,600 m$^2$/g, the electroconductive carbon filler has too low a bulk density, and this leads to decreases in the handleability of the electroconductive carbon filler during resin composition production and in production efficiency, resulting in an increase in production cost. In the invention, the term "specific surface area" means BET specific surface area determined by the BET method through a measurement made in accordance with a liquid nitrogen adsorption method (ASTM D3037).

In the other embodiment, which is capable of accommodating decreases in electroconductive-filler addition amount, the specific surface area of the electroconductive filler (E) according to the invention is in the range of 500-1,600 m$^2$/g, preferably 550-1,500 m²/g, more preferably 600-1,450 m²/g. Electroconductive carbon has a large specific surface area due to the numerous pores present therein, etc.; the larger the specific surface area, the better the efficiency of conductivity impartation. Furthermore, the larger the specific surface area, the smaller the addition amount in which electrical conductivity can be imparted. In case where the specific surface area thereof is less than 500 m²/g, it is necessary to add the electroconductive filler in a large amount for imparting sufficient electrical conductivity, undesirably resulting in decreases in impact resistance and tensile elongation at rupture. In case where the specific surface area thereof exceeds 1,600 m²/g, the electroconductive carbon filler has too low a bulk density, and this leads to decreases in the handleability of the electroconductive carbon filler during resin composition production and in production efficiency, resulting in an increase in production cost.

The electroconductive filler (E) according to the invention may have undergone a surface treatment with a surface-treating agent such as a titanate-based, aluminum-based, or silane-based surface-treating agent. It is also possible to use a granulated electroconductive filler in order to improve the efficiency of melt kneading operation. From the standpoint of obtaining excellent surface smoothness, it is preferable that the electroconductive filler to be used in the invention should be powdery, particulate, platy, or flaky.

[6] Electroconductive Polyethylene Resin Composition

The electroconductive polyethylene resin composition of the invention has a feature wherein the electroconductive polyethylene resin composition itself is less apt to be charged and is capable of removing the charges which have accumulated in chargeable substances in contact with the electroconductive polyethylene resin composition, via the electroconductive polyethylene resin composition.

More specifically, since the electroconductive polyethylene resin composition has electrical conductivity, the charges which have accumulated in a charged chargeable substance move to the electroconductive polyethylene side when this chargeable substance comes into contact with the electroconductive polyethylene resin composition, and the charges can be released from the electroconductive polyethylene resin composition by bringing the electroconductive polyethylene resin into contact with the other electrical conductor or grounding the resin. The electroconductive polyethylene resin composition must have a specific value of surface resistivity. In cases when the surface resistivity thereof is in the range of 10 to $1 \times 10^{10}$ Ω/□, preferably $10^2$ to $1 \times 10^9$ Ω/□, more preferably $10^3$ to $1 \times 10^8$ Ω/□, the electroconductive polyethylene resin composition is less apt to be charged.

(1) Configuration of the Electroconductive Polyethylene Resin Composition

The electroconductive polyethylene resin composition according to the invention is characterized in that the proportion of the electroconductive filler (E) to 100 parts by weight of the total amount of the resin component including the polar-group-containing polyethylene resin (A) and the polyethylene resin (B) is 6-30 parts by weight, preferably 6.5-28 parts by weight, more preferably 7-26 parts by weight, even more preferably 7.5-25 parts by weight, especially preferably 6-20 parts by weight, in particular 6.5-18 parts by weight, most preferably 7-17 parts by weight. In case where the proportion of the electroconductive filler (E) is less than 6 parts by weight, electrical conductivity is not imparted. In case where the proportion thereof exceeds 30 parts by weight, not only the composition decreases in impact resistance and tensile elongation at rupture but also an increase in production cost results.

(2) Makeup of Resin Component in the Electroconductive Polyethylene Resin Composition In the resin component in the electroconductive polyethylene resin composition according to the invention, the proportions of the polar-group-containing polyethylene resin (A) and the polyethylene resin (B) are as follows. The proportions of the polar-group-containing polyethylene resin (A) and the polyethylene resin (B) are 0.5-80 wt % and 99.5-20 wt %, respectively. Preferably, the proportions of the polar-group-containing polyethylene resin (A) and the polyethylene resin (B) are 1-75 wt % and 99-25 wt %, respectively. More preferably, the proportions of the polar-group-containing polyethylene resin (A) and the polyethylene resin (B) are 5-70 wt and 95-30 wt %, respectively. Even more preferably, the proportions of the polar-group-containing polyethylene resin (A) and the polyethylene resin (B) are 10-65 wt % and 90-35 wt %, respectively. In case where the proportion of the polar-group-containing polyethylene resin (A) is less than 0.5 wt %, the adhesiveness to different kinds of materials is insufficient. In case where the proportion of the polar-group-containing polyethylene resin (A) exceeds 80 wt %, not only it is difficult to control properties including impact resistance, flowability, and tensile properties, but also the addition of the polar-group-containing polyethylene resin, which is relatively expensive, in such a large amount leads to an increase in production cost.

(3) Other Embodiment Regarding the Makeup of Resin Component in the Electroconductive Polyethylene Resin Composition In the case where a polyethylene resin produced with a single-site catalyst has been incorporated into the resin component of the electroconductive polyethylene resin composition according to the invention, the proportions of the polar-group-containing polyethylene resin (A), the polyethylene resin (C), and the other polyethylene resin (D) in the resin component in the electroconductive polyethylene resin composition are as follows. The proportions of the polar-group-containing polyethylene resin (A), the polyethylene resin (C), and the polyethylene resin (D) are in the ranges of 0.5-80 wt %, 5-75 wt %, and 0-94.5 wt % respectively. Preferably, the proportions of the polar-group-containing polyethylene resin (A), the polyethylene resin (C), and the polyethylene resin (D) are in the ranges of 1-75 wt %, 5-70 wt %, and 0-94 wt %, respectively. More preferably, the proportions of the polar-group-containing polyethylene resin (A), the polyethylene resin (C), and the polyethylene resin (D) are in the ranges of 5-70 wt %, 5-60 wt %, and 0-90 wt %, respectively. Even more preferably, the proportions of the polar-group-containing polyethylene resin (A), the polyethylene resin (C), and the polyethylene resin (D) are in the ranges of 10-65 wt %, 5-55 wt %, and 0-85 wt %, respectively. In case where the proportion of the polar-group-containing polyethylene resin (A) is less than 0.5 wt %, the adhesiveness to different kinds of materials is insufficient. In case where the proportion of the polar-group-containing polyethylene resin (A) exceeds 80 wt %, not only it is difficult to control properties including impact resistance, flowability, and tensile properties, but also the addition of the polar-group-containing polyethylene resin, which is relatively expensive, in such a large amount leads to an increase in production cost. Meanwhile, in case where the proportion of the polyethylene resin (C) is less than 5 wt %, the composition has poor creep resistance. In case where the proportion thereof exceeds 75 wt %, this composition is too low in yield strength and rigidity.

(4) HL-MFR of the Electroconductive Polyethylene Resin Composition

It is desirable that the high-load melt-flow rate (HL-MFR) of the electroconductive polyethylene resin composition according to the invention, as measured at a temperature of 190° C. under a load of 21.6 kg, should be in the range of 1.0-100 g/10 min, preferably 2.0-50 g/10 min, more preferably 4.0-25 g/10 min. In case where the HL-MFR thereof is less than 1.0 g/10 min, there is a possibility that the composition might show insufficient flowability during molding and have impaired molding stability. In case where the HL-MFR thereof exceeds 100 g/10 min, the composition may be insufficient in mechanical property such as impact resistance and creep resistance.

(5) Density of the Electroconductive Polyethylene Resin Composition

The density of the electroconductive polyethylene resin composition according to the invention may be in the range of 0.930-1.150 g/cm$^3$, preferably 0.940-1.125 g/cm$^3$, more preferably 0.950-1.100 g/cm$^3$, even more preferably 0.950-1.075 g/cm$^3$, most preferably 0.950-1.050 g/cm$^3$. Densities thereof less than 0.930 g/cm$^3$ lead to decreases in rigidity, chemical resistance, and fuel oil resistance. Densities thereof exceeding 1.150 g/cm$^3$ result in insufficient mechanical properties such as impact resistance and creep resistance.

In the other embodiment, the density of the electroconductive polyethylene resin composition according to the invention is in the range of 0.930-1.100 g/cm$^3$, preferably 0.940-1.075 g/cm$^3$, more preferably 0.950-1.050 g/cm$^3$. Densities thereof less than 0.930 g/cm$^3$ lead to decreases in rigidity, chemical resistance, and fuel oil resistance. Densities thereof exceeding 1.150 g/cm$^3$ result in insufficient mechanical properties such as impact resistance and creep resistance.

(6) Tensile Yield Strength of the Electroconductive Polyethylene Resin Composition The tensile yield strength of the electroconductive polyethylene resin composition according to the invention may be in the range of 10-35 MPa, preferably 10-30 MPa, more preferably 12-32 MPa, even more preferably 14-28 MPa. In case where the tensile yield strength thereof is less than 10 MPa, this electroconductive polyethylene resin composition has insufficient rigidity. In case where the tensile yield strength thereof is higher than 35 MPa, this composition is poor in mechanical performance such as impact resistance and creep resistance.

(7) Tensile Elongation at Rupture of the Electroconductive Polyethylene Resin Composition The tensile elongation at rupture of the electroconductive polyethylene resin composition according to the invention may be 200% or higher, preferably 300% or higher, more preferably 400% or higher. Tensile elongations at rupture thereof less than 200% are undesirable because there is a possibility that molded articles thereof might be damaged upon application of external force thereto. Meanwhile, since this composition is a polyethylene resin composition, a maximum point is about 1,100%. For increasing the tensile elongation at rupture of the electroconductive polyethylene resin composition according to the invention, it is effective to reduce the addition amount of the electroconductive carbon. However, the tensile elongation at rupture thereof can be regulated to some degree also by reducing the BET specific surface area of the electroconductive carbon.

(8) Surface Resistivity of the Electroconductive Polyethylene Resin Composition

The surface resistivity of the electroconductive polyethylene resin composition according to the invention is in the range of 10 to $1\times10^{10}$ Ω/□, preferably $10^2$ to $10^9$ Ω/□, more preferably $10^3$ to $1\times10^8$ Ω/□. In case where the surface resistivity thereof is higher than $10^{10}$ Ω/□, this composition has insufficient electrical conductivity and is poor in antistatic performance, etc. Meanwhile, for reducing the surface resistivity to less than 10 Ω/□, it is necessary to excessively add the electroconductive carbon filler. The excessive addition of the filler makes the composition poor in other properties, e.g., mechanical property. Incidentally, the surface resistivity can be regulated by regulating the addition amount of the electroconductive carbon filler. There is a tendency that the larger the addition amount thereof, the lower the surface resistivity and the higher the electrical conductivity.

(9) Melting Point of the Electroconductive Polyethylene Resin Composition

The melting point of the electroconductive polyethylene resin composition according to the invention may be 50-140° C., preferably 70-138° C., more preferably 100-135° C. In case where the melting point thereof is lower than 50° C., products thereof have poor suitability for practical use in ordinary use environments.

(10) Charpy Impact Strength of the Electroconductive Polyethylene Resin Composition The Charpy impact strength at −40° C. of the electroconductive polyethylene resin composition according to the invention may be 2.0 kJ/m$^2$ or higher, preferably 2.5 kJ/m$^2$ or higher, more preferably 3.0 kJ/m$^2$ or higher. In case where the Charpy impact strength at −40° C. thereof is less than 2.0 kJ/m$^2$, molded articles thereof have insufficient impact strength and are undesirable from the standpoint of practical use. There are cases where specimens having an increased −40° C. Charpy impact strength do not undergo a complete rupture in a measurement of Charpy impact strength. In the examination for Charpy impact strength at −40° C., the case where the test sample has undergone no rupture is most preferable, and even the case where a partial rupture of a hinge rupture has occurred is satisfactory. Even in the case of a complete rupture, the Charpy impact strength even in the range of up to, for example, 15.0 kJ/m$^2$, or up to 10.0 kJ/m$^2$, may be considered to be sufficient so long as the strength value is 2.0 kJ/m$^2$ or higher.

(11) Creep Resistance of the Electroconductive Polyethylene Resin Composition

The creep resistance of the electroconductive polyethylene resin composition according to the invention is expressed in terms of the rupture time measured in a full-notch tensile creep test (FNCT test; measured at 80° C. and 4.9 MPa). In cases when the rupture time is 10 hours or longer, preferably 50 hours or longer, more preferably 100 hours or longer, even more preferably 200 hours or longer, molded articles of the electroconductive polyethylene resin composition have sufficient creep resistance. In case where the rupture time in the full-notch tensile creep test (FNCT test; measured at 80° C. and 4.9 MPa) is less than 10 hours, the creep resistance is insufficient and there is a high possibility that the molded articles might suffer a creep rupture. Such too short rupture times are hence undesirable. For improving the creep resistance of the electroconductive polyethylene resin composition, it is effective to increase the incorporation amount of the polyethylene resin (C) or to reduce the addition amount of the electroconductive filler (E). Furthermore, to lower the density of the resin component of the electroconductive polyethylene resin composition is also effective to some degree.

The FNCT test can be performed with reference to the appendix JD described in JIS K6774:2013. The measurement is made by the method according to the appendix JD described in JIS K6774:2013, except that a different method for test sample production is used and that the test load and measurement time are arbitrarily changed.

(12) Methods for Producing the Electroconductive Polyethylene Resin Composition

The electroconductive polyethylene resin composition according to the invention can be produced by known methods, and production methods therefor are not particularly limited. For example, the composition can be produced by a production method in which a polar-group-containing polyethylene resin (A), a polyethylene resin (B), and an electroconductive filler (E) are mixed together, optionally together with other ingredients, by means of a blender such as a supermixer, Henschel mixer, or Superfloater, and the mixture is fed to a single-screw extruder, twin-screw extruder, kneader, Banbury mixer, reciprocating kneading machine (BUSS KNEADER), roll type kneading machine, or the like and melt-kneaded thereby.

Although all the materials may be simultaneously fed to a kneading device and melt-kneaded to thereby produce the electroconductive polyethylene resin composition, melt kneading may be performed in a plurality of steps. For example, the electroconductive polyethylene resin composition can be produced by a method in which the ingredients as raw materials are introduced into kneading equipment in any desired sequence or are caused to undergo a plurality of raw-material blending or melt-kneading steps. Examples thereof include: a method in which a continuous kneading device such as a twin-screw extruder is used in such a manner that a polar-group-containing polyethylene resin (A) and a polyethylene resin (B) are melt-kneaded in the front half of the kneading equipment and an electroconductive carbon filler (E) is introduced at the middle of the extruder into the kneading device to further conduct melt kneading, thereby obtaining a resin composition; a method in which some or all of a polar-group-containing polyethylene resin (A) and some or all of a polyethylene resin (B) are melt-kneaded together with an electroconductive carbon filler (E) in the front half of kneading equipment and the remainder of the polar-group-containing polyethylene resin (A) and polyethylene resin (B) is introduced at the middle of the extruder into the kneading device to further conduct melt kneading, thereby obtaining a resin composition; and a method in which a resin composition which contains an electroconductive carbon filler (E) in an amount larger than the content thereof to be finally obtained is produced beforehand, for example, by either of the methods described above and the polar-group-containing polyethylene resin (A) and/or the polyethylene resin (B) is further added to the resin composition in the other melt kneading step to finally produce an electroconductive polyethylene resin composition which contains the electroconductive carbon filler (E) in the desired amount.

In the other embodiment, in the production methods described above, use can be made of a polyethylene resin (C) produced by polymerization using a metallocene-based catalyst and the other polyethylene resin (D) in place of the polyethylene resin (B).

(13) Other Ingredients

Various elastomers, other resins, tacky materials, etc. can be incorporated into the electroconductive polyethylene resin composition according to the invention so long as the incorporation thereof does not defeat the objects of the invention.

Examples of the elastomer ingredients include ethylene/propylene-based rubbers, butadiene-based rubbers, isobutylene rubbers, isoprene-based rubbers, natural rubber, and nitrile rubbers. One of these may be used, or two or more thereof may be used.

Examples of the ethylene/propylene-based rubbers include a random copolymer (EPM) in which the backbone includes ethylene units and propylene units and a random copolymer (EPDM) in which the backbone further includes diene monomer units (dicyclopentadiene, ethylidenenorbornene, etc.) as a third component. Examples of the butadiene-based rubbers include a styrene/butadiene block copolymer (SBS) and a styrene/butadiene/ethylene copolymer (SBES) which is a derivative of the block copolymer produced by hydrogenation or partial hydrogenation, 1,2-polybutadiene (1,2-PB), a maleic anhydride/butadiene/styrene copolymer, and a modified butadiene rubber having a core/shell structure.

Examples of the tacky materials include: olefinic, aliphatic, aromatic, and aliphatic-aromatic petroleum resins and products of hydrogenation thereof; rosin-based resins, such as natural rosin and polymerized rosin, and products of hydrogenation thereof; terpene-based resins, such as polyterpene-based resins and terpene-phenolic resins, and products of hydrogenation thereof; and coumarone-indene resins and products of hydrogenation thereof.

Examples of the other resins include the same thermoplastic resins as those which will be enumerated later under Adherend.

(14) Additives

Various additives can be incorporated into the electroconductive polyethylene resin composition according to the invention so long as the incorporation thereof does not defeat the objects of the invention.

Examples of the kinds of the additives include antioxidants, neutralizing agents, lubricants, anti-blocking agents, pigments, weathering agents, nucleators, flame retardants, and fillers. However, it is preferred to avoid incorporation of metal soaps, such as calcium stearate and zinc stearate, since there is a possibility that metal soaps might reduce the strength of adhesion to different kinds of materials.

[7] Laminate (1) Laminate

The laminate according to the invention is a laminate which at least includes a layer constituted of the electroconductive polyethylene resin composition according to the invention and in which a layer constituted of an adherend has been superposed on that layer.

(2) Adherend

The laminate according to the invention may be a laminate composed of a layer constituted of a resin having no polar groups, which is represented by polyolefin resins such as polyethylene resins and polypropylene resins, and a layer constituted of the electroconductive polyethylene resin composition according to the invention. However, from the standpoint of enabling the electroconductive polyethylene resin composition according to the invention to exhibit the adhesiveness characteristic thereof, the laminate of the invention may be one which includes a layer constituted of an adherend to which polyethylene resins do not easily adhere. This laminate can be utilized more profitably.

Examples of the adherend according to the invention include thermoplastic resins such as polyolefin resins, e.g., polyethylene resins and polypropylene resins, cycloolefin copolymers, poly(vinyl chloride), polystyrene, polyamide resins, polyester resins, saponified ethylene/vinyl acetate copolymer resins (EVOH), polycarbonates, polyacetals, poly(phenylene ether)s, and poly(phenylene sulfide), metallic materials such as aluminum, iron, steels, and stainless steels, various kinds of paper, cellophane, woven fabric, and nonwoven fabric.

(3) Polyolefin Resins

Examples of the polyolefin resins include high-density polyethylene, medium-density polyethylene, low-density polyethylene, ethylene-vinyl acetate copolymers, ethylene/acrylic ester copolymers, ethylene/acrylic ester/maleic anhydride copolymers, ethylene/glycidyl methacrylate copolymers, ionomers, and polypropylene resins. Although these resins may be used alone, it is also possible to use two or more thereof in combination.

(4) Polyamides

Examples of the polyamides include nylon-6, nylon-6,6, nylon-6,10, nylon-12, nylon-11, nylon-9, nylon-7, polyamide-4,6, polyamide-6,12, poly(m-xylylene adipamide), and various aromatic nylons such as polyamide-6T, polyamide-9T, and polyamide-10T. The carboxyl or amino groups at the molecular chain terminals may have been replaced with other functional groups. Although these polyamides may be used alone, it is also possible to use two or more thereof in combination.

(5) Polyesters

Examples of the polyesters include aromatic-ring-containing polyesters and aliphatic polyesters. Examples of the aromatic-ring-containing polyesters include poly(ethylene terephthalate), poly(butylene terephthalate), poly(ethylene isophthalate), poly(butylene isophthalate), and poly(p-phenylene ester)s such as poly(p-phenylene malonate), poly(p-phenylene adipate), and poly(p-phenylene terephthalate). Examples of the aliphatic polyesters include poly(butylene adipate), poly(ethylene adipate), poly($\epsilon$-caprolactam), poly(lactic acid), poly(butylene succinate), poly(butylene succinate-adipate), and polyhydroxybutyrates. Although these polyesters may be used alone, it is also possible to use two or more thereof in combination.

(6) Polycarbonates

Polycarbonates are polymers or copolymers obtained, for example, by the phosgene process, in which various dihydroxydiaryl compounds are reacted with phosgene, or the transesterification process, in which a dihydroxydiaryl compound is reacted with a carbonic ester, e.g., diphenyl carbonate. Representative examples among such polycarbonates include aromatic polycarbonate resins produced from 2,2-bis(4-hydroxyphenyl)propane (bisphenol A) and phosgene. Although such polycarbonates may be used alone, it is also possible to use two or more thereof in combination.

(7) Polyacetals

Examples of the polyacetals include polyoxymethylene, polyoxyethylene, polyoxyphenylene (PPO), and poly(1,3-dioxolane). Although these polyacetals may be used alone, it is also possible to use two or more thereof in combination.

(8) Poly(phenylene ether)s

Poly(phenylene ether)s are synthetic resins having an aromatic polyether structure. Examples of the poly(phenylene ether)-based resins include poly(2,6-dimethylphenylene 1,4-ether), poly(2-methyl-6-ethylphenylene 4-ether), poly(2,6-diethylphenylene 1,4-ether), poly(2,6-diethylphenylene 1,4-ether), poly(2-methyl-6-n-propylphenylene 1,4-ether), poly(2-methyl-6-n-butylphenylene 1,4-ether), poly(2-methyl-6-chlorophenylene 1,4-ether), poly(2-methyl-6-bromophenylene 1,4-ether), and poly(2-ethyl-6-chlorophenylene 1,4-ether). Although these poly(phenylene ether)s may be used alone, it is also possible to use two or more thereof in combination.

(9) Poly(phenylene sulfide)

Poly(phenylene sulfide) is a high-performance engineering plastic which has a molecular structure made up of alternating phenylene groups (benzene rings) and sulfur atoms (S). Although such polymers may be used alone, it is also possible to use two or more thereof in combination.

(10) Metals

Examples of the metals include aluminum, iron, steels, stainless steels, copper, tin, and brass, and mixtures, multi-layer structures, and composite materials of these metals.

As the aluminum, use can be made of ones shown in JIS H4140-1998. Specific examples thereof include A1100FD, A1200FD, A2014FD, A2017FD, A2018FD, AD2218FD, A2219FD, A2025FD, A4032FD, A5052FH, A5056FD, A5083FD, A6165FD, A6061FD, A7050FD, A7075FD, and A7N01FH.

Examples of the stainless steels include martensitic stainless steel, ferritic stainless steel, austenitic stainless steel, and austenitic/ferritic two-phase stainless steel. Specific examples thereof include SUS201, SUS202, SUS301, SUS302, SUS303, SUS304, SUS305, SUS316, SUS317, SUS403, SUS405, SUS420, SUS430, SUS430LX, SUS436, and SUS630.

As the iron or steels, use can be made of the various steels and steel materials shown in, for example, JIS G0203 and JIS G0204, cast or forged products thereof, and the like, without limitations. These iron or steel materials may have undergone various surface treatments or have been plated.

(11) Methods for Producing the Laminate

Methods for producing the laminate according to the invention are not limited. Examples thereof include various forming or molding techniques such as ordinary press molding, inflation molding, extrusion molding such as flat-die molding (T-die molding), extrusion molding of tubular articles, and corrugated-pipe molding, laminating techniques such as extrusion laminating, sandwich laminating, and dry laminating, blow molding, air-pressure forming, vacuum forming, air-pressure/vacuum forming, injection molding, and rotary molding. Examples thereof further include conventionally known processing techniques such as: a thermal fusion bonding method in which some of a molded article obtained by molding the electroconductive polyethylene resin composition by any of those forming or molding techniques is thermally melted again and press-bonded with heating to a layer constituted of an adherend; and a thermal press-bonding method in which a molded article of the electroconductive polyethylene resin composition and a molded article as an adherend, the molded articles having been separately produced beforehand, are introduced into a mold for hot pressing and bonded to each other by applying heat and pressure thereto.

(12) Multilayer Coextrusion Molding

The multilayer coextrusion molding according to the invention is a technique for forming a molded article having a multilayer structure, in which a plurality of thermoplastic resin materials are simultaneously extrusion-molded using respective extruders and the extruded layers are combined with each other at or after the converging part and shaped by any of various methods, thereby producing the desired molded article.

Examples of the multilayer coextrusion molding according to the invention include known multilayer coextrusion molding techniques such as air-cooling multilayer inflation molding, two-stage air-cooling multilayer inflation molding, high-speed multilayer inflation molding, water-cooling multilayer inflation molding, multilayer flat-die molding (T-die molding), molding of a multilayered tubular article, and molding of a multilayered corrugated pipe. By processing a layer including the electroconductive polyethylene resin composition according to the invention and an appropriate adherend by a molding technique such as those shown above as examples, a known multilayered coextrusion-molded article can be produced, such as a multilayered film, multilayered sheet, multilayered pipe, multilayered hose, multilayered tube, or multilayered corrugated pipe. It is also possible to conduct post-processing in which the laminates produced by these techniques are reheated and processed into other shapes.

(13) Multilayer Blow Molding

Methods for the multilayer blow molding according to the invention are not limited. Examples thereof include known blow molding techniques such as multilayer direct-blow molding, multidimensional multilayer blow molding, and multilayer rotary blow molding.

(14) Methods for Producing the Laminate by Injection Molding

A method for producing a laminate by injection molding according to the invention is a method in which a plurality of layers including a layer including the electroconductive polyethylene resin composition according to the invention are laminated using an injection molding technique, thereby producing a laminate. The layers to be laminated must be layers of at least two kinds, at least one of which must be a layer including the electroconductive polyethylene resin composition according to the invention. As the injection molding technique for producing the laminate, a known injection molding technique can be used. Examples of methods for the laminating include: a method in which the electroconductive polyethylene resin composition of the invention is processed beforehand into a structure suitable for the laminate by a known technique such as injection molding, extrusion molding, press molding, or cutting, and this processed composition is inserted into an injection mold and an adherend material is injected into the injection mold containing the inserted composition, thereby combining the two materials with each other; a method in which an adherend is processed beforehand into a structure suitable for the laminate, and this processed adherend is inserted into an injection mold and the electroconductive polyethylene resin composition according to the invention is injected into the injection mold containing the inserted adherend, thereby combining the two materials with each other; and a method in which a multicolor injection molding machine having a plurality of injection units is used, and the composition according to the invention and an adherend material are successively injected into a mold in an appropriate sequence, thereby forming a multilayer structure.

[8] Non-Charging Molded Article

The non-charging molded article of the invention is a molded article obtained by shaping the electroconductive polyethylene resin composition of the invention by any of various molding techniques. This molded article has non-charging property imparted thereto due to the electrical conductivity thereof. The non-charging molded article of the invention has a feature wherein the non-charging molded article itself is less apt to be charged and is capable of removing the charges which have accumulated in chargeable substances, via the non-charging molded article.

More specifically, since the non-charging molded article has electrical conductivity, the charges which have accumulated in a charged chargeable substance move to the non-charging molded article when this chargeable substance comes into contact with the non-charging molded article, and the charges can be released from the non-charging molded article by bringing the electroconductive polyethylene resin into contact with the other electrical conductor or grounding the resin. The electroconductive polyethylene resin composition constituting the non-charging molded article must have a specific value of surface resistivity. In cases when the surface resistivity thereof is in the range of 10 to $1 \times 10^{10}$ Ω/□, preferably $10^2$ to $1 \times 10^9$ Ω/□, more preferably $10^3$ to $1 \times 10^8$ Ω/□, the non-charging molded article is less apt to be charged.

[9] Non-Charging Laminate

The non-charging laminate of the invention is a laminate which at least includes a layer constituted of the electroconductive polyethylene resin composition of the invention and in which a layer constituted of an adherend has been superposed on that layer. This laminate has non-charging property imparted thereto due to the electrical conductivity of the layer constituted of the electroconductive polyethylene resin composition of the invention. The non-charging laminate of the invention has a feature wherein the non-charging laminate itself is less apt to be charged and is capable of removing the charges which have accumulated in other members, via the electroconductive polyethylene resin composition layer of the non-charging laminate.

More specifically, since the electroconductive polyethylene resin composition layer of the non-charging laminate has electrical conductivity, the charges which have accumulated in the other member move to the electroconductive polyethylene resin composition layer when this charged member comes into contact with the electroconductive polyethylene resin composition layer of the non-charging laminate, and the charges can be released from the electroconductive polyethylene resin composition layer by bringing the electroconductive polyethylene resin into contact with the other electrical conductor or grounding the resin. The electroconductive polyethylene resin composition constituting the electroconductive polyethylene resin composition layer of the non-charging laminate must have a specific value of surface resistivity. In cases when the surface resistivity thereof is in the range of 10 to $1 \times 10^{10}$ Ω/□, preferably $10^2$ to $1 \times 10^9$ Ω/□, more preferably $10^3$ to $1 \times 10^8$ Ω/□, the non-charging laminate is less apt to be charged.

[10] Applications of the Electroconductive Polyethylene Resin Composition

The electroconductive polyethylene resin composition according to the invention not only has electrical conductivity and adhesiveness to highly polar materials of different kinds, but also has both non-charging property and the ability to remove charges from chargeable substances, due to the electrical conductivity of the composition. Moreover, this composition has excellent creep resistance and combines excellent properties possessed by polyethylene resins, such as mechanical properties, lightweight properties, chemical resistance, fuel oil resistance, productivity, and low cost. The electroconductive polyethylene resin composition is hence applicable as useful multilayered molded objects. Specifically, the electroconductive polyethylene resin composition laminated to or superposed on various adherends can be extensively utilized, for example, in the field of packaging materials and packaging containers, the field of industrial materials such as fibers, pipes, fuel tanks, hollow containers, and drum cans, the field of civil engineering works including water cut-off materials, the electronic field including members for electronic appliances and domestic electrical appliances, and the electrical-wire field including electrical wires and cables.

Examples of such applications of the electroconductive polyethylene resin composition according to the invention include uses in which electromagnetic-shielding properties or antistatic properties are required. In such uses, the imparted electrical conductivity of the composition can be more effectively utilized. More specifically, the composition can be extensively used in a variety of applications including: housing or casing materials for electrical/electronic appliances; trays or carrier tapes for components required to be free from dust adhesion, e.g., electronic components, and members or insuloks for the trays or carrier tapes; applications with which a flammable liquid, e.g., gasoline, comes into contact or is in contact, e.g., peripheral components with which automotive fuels come into contact or are in contact, such as fuel filler ports, filler caps, valves to be fusion-bonded to fuel tank main bodies, e.g., rollover valves, inlet check valves, and fill limit vent valves, covers for fuel pump fixing, filler necks, filler tubes, inlet pipes, breather tubes, and fuel tanks; applications with which a chargeable powder, e.g., a polyethylene powder, comes into contact, such as hoses for powder transport, charge-removing members for powder silos, charge-removing members for hoppers, screens, etc. for powder transport, and charge-removing members for preventing dust explosions; and cans for industrial chemicals and the covers thereof, and drum cans and the covers thereof.

EXAMPLES

The present invention will be explained below in more detail by reference to Examples, but the invention should not be construed as being limited to the following Examples unless the invention departs from the spirit thereof.
1. Evaluation Methods
(1) MFR, HL-MFR Melt flow rate (MFR) was determined under the conditions of 190° C. and a load of 2.16 kg in accordance with JIS K7210:1999. High-load melt flow rate (HL-MFR) was determined under the conditions of 190° C. and a load of 21.6 kg in accordance with JIS K7210: 1999.
(2) Density Density was determined in accordance with JIS K7112: 1999, method D.
(3) Charpy Impact Strength at −40° C.

Notch Charpy impact strength was measured in an environment of −40° C. in accordance with JIS K7111-1:2006, and the measured value was taken as Charpy impact strength. Specimens were produced by punching strip-shaped specimens described in JIS K7139 (type B3) out of a 4-mm-thick press-formed sheet obtained in accordance with JIS K7151 under the conditions of a pressing temperature of 180° C. and gradual cooling (cooling method D) and machining the strip-shaped specimens into Charpy edgewise impact (e) single-notch specimens. The notch shape was type A. As the measuring apparatus, use was made of digital impact tester DG-UB, manufactured by Toyo Seiki Seisaku-Sho, Ltd.
(4) Tensile Yield Strength The strength was measured in accordance with ASTM D638-97. The specimen shape was type 4 (thickness: 2.0 mm), and the specimens were produced by punching out of a 2-mm-thick press-formed sheet obtained in accordance with JIS K7151 under the conditions of a pressing temperature of 180° C. and gradual cooling (cooling method D). The pulling speed was 50 mm/min. As the measuring apparatus, use was made of Tensilon (Type: RTG-1250), manufactured by A&D Co., Ltd.

(5) Tensile Elongation at Rupture

The elongation was measured in accordance with ASTM D638-97. The specimen shape was type 4 (thickness: 2.0 mm), and the specimens were produced by punching out of a 2-mm-thick press-formed sheet obtained in accordance with JIS K7151 under the conditions of a pressing temperature of 180° C. and gradual cooling (cooling method D). The pulling speed was 50 mm/min. As the measuring apparatus, use was made of Tensilon (Type: RTG-1250), manufactured by A&D Co., Ltd.
(6) Melting Point Melting point was measured in accordance with ISO 11357-3:2011. DSD (DSD 7020), manufactured by SII Nano Technology Inc., was used for the measurement, which was performed under the following conditions.

About 5.0 mg of a sample was packed into an aluminum pan, heated to 200° C. at 10° C./min, held at 200° C. for 5 minutes, and then cooled to 30° C. at 10° C./min. This sample was held at 30° C. for 5 minutes, and was then heated again to 200° C. at 10° C./min, during which an absorption curve was determined. The peak temperature thereof was taken as the melting point.
(7) Surface Resistivity In accordance with JIS K6911:1995, the resistivity was measured by the double-ring electrode method. A 2-mm-thick press-formed sheet obtained in accordance with JIS K7151 under the conditions of a pressing temperature of 180° C. and gradual cooling (cooling method D) was used as a sample and examined under the conditions of an applied voltage of 500 V. As the measuring device, use was made of High Resistivity Meter 8340A and Chamber 12702A, both manufactured by ADC Corp. The unit was Ω/□ (ohms per square).
(8) Adhesive Strength Adhesive strength was determined by press-forming the resin to be examined into a plate shape, stacking this plate and a stainless-steel plate separately processed, hot-pressing the stack to thereby produce a laminate, and subjecting the laminate to a peel test. The preparation methods and measuring method used in these steps are explained below in order.
Method for Preparing Resin Plate for Adhesive Strength Measurement The resin to be examined was press-formed into a 2-mm-thick sheet in accordance with JIS K7151 under the conditions of a pressing temperature of 180° C. and gradual cooling (cooling method D). Resin plates were punched out of this press-formed sheet so as to result in dimensions of 25 mm×100 mm. Thus, resin plates for adhesive strength measurement which had a size of 25 mm×100 mm and a thickness of 2 mm were produced.
Method for Preparing Laminate Each of the resin plates for adhesive strength measurement obtained by the Method for Preparing Resin Plate and a stainless-steel plate (SUS436) which had been processed into a size of 25 mm×100 mm and a thickness of 2 mm were stacked, and this stack was placed in a mold for hot pressing which had dimensions of 25 mm×100 mm×4 mm (thickness). Using a hot press having a surface temperature of 180° C., the stack was pressed at 1.0 MPa for 3 minutes. Thereafter, the mold was transferred to a press having a surface temperature of 25° C., and the stack was held at a pressure of 1.0 MPa for 3 minutes and cooled thereby. Thus, a laminate was produced.

Method for Measuring Adhesive Strength

In each laminate obtained by the Method for Preparing Laminate, the resin only was incised in a width of 10 mm in an area near the center. This laminate was subjected to 90° peeling at a speed of 50 mm/min using a tensile tester to thereby measure the adhesive strength. The unit of the adhesive strength was N/mm.

(9) BET Specific Surface Area

BET specific surface area was determined by the liquid nitrogen adsorption method (ASTM D3037).

(10) Creep Resistance

Creep resistance is determined through a full-notch tensile creep test (FNCT test). The FNTC test was performed with reference to the appendix JD described in JIS K6774:2013. Test samples were produced by producing a 10-mm-thick sheet in accordance with JIS K7151 under the conditions of a pressing temperature of 180° C. and gradual cooling (cooling method D), cutting square prisms of 6 mm×6 mm×60 mm out of the sheet, and forming a razor blade notch having a depth of 1 mm over the whole middle-part periphery of each of the test pieces using a notching jig. Subsequently, the test pieces were conditioned at 80° C. for 1 hour and then subjected to an FNCT test under a load of 8 kg, and the time period required for each test piece to rupture completely was measured. Incidentally, in the case where a load of 8 kg is imposed on a test sample of the test pieced shape shown above, the stress applied to the sample is 4.9 MPa.

II. Resin Materials (1) Polar-Group-Containing Polyethylene Resins

Production Example 1

Production of Polar-Group-Containing Polyethylene Resin (A-1)

To 100 parts by weight of a commercial high-density polyethylene resin (HS420P) were added 0.6 parts by weight of maleic anhydride and 0.015 parts by weight of 2,5-di(t-butylperoxy)hexane. These ingredients were sufficiently mixed together by means of a Henschel mixer and then melt-kneaded using a 50-mm single-screw extruder manufactured by Modern Machinery Ltd., under the conditions of a screw rotation speed of 50 rpm and a resin temperature of 280° C. to conduct a graft modification. Thus, a polar-group-containing polyethylene resin (A-1) was obtained. The polar-group-containing polyethylene resin obtained had an MFR of 0.08 g/10 min and a density of 0.954 g/cm$^3$. The manufacturer of the polyethylene resin used as a raw material and the MFR and density are shown in Table 1.

Production Example 2

Production of Polar-Group-Containing Polyethylene Resin (A-2)

A polar-group-containing polyethylene resin (A-2) was obtained in the same manner as in Production Example 1, except that the polyethylene resin (HS420P) used as a raw material to be modified was replaced by a polyethylene resin (HS430P). The polar-group-containing polyethylene resin obtained had an MFR of 0.2 g/10 min and a density of 0.954 g/cm$^3$. The manufacturer of the polyethylene resin used as a raw material and the MFR and density are shown in Table 1.

(2) Polyethylene Resins (B)

The polyethylene resins (B-1) to (B-3) described in Table 1 were used as polyethylene resins (B). The MFR and density of each polyethylene resin are also shown in the table. In the table, "HDPE" denotes high-density polyethylene, and "LLDPE" denotes linear low-density polyethylene.

(3) Polyethylene Resins (C)

The polyethylene resins (C-1) and (C-2) described in Table 1 were used as polyethylene resins produced using a metallocene-based catalyst. The MFR and density of each polyethylene resin are also shown in Table 1. In the table, "m-LLDPE" denotes linear low-density polyethylene produced using a metallocene-based catalyst.

(4) Polyethylene Resins (D)

The polyethylene resins (D-1) to (D-3) described in Table 1 were used as polyethylene resins (D). The MFR and density of each polyethylene resin are also shown in Table 1.

TABLE 1

| Symbol | Grade | Manufacturer | Trade name | Classification of resin | MFR (g/10 min) | Density (g/cm$^3$) |
| --- | --- | --- | --- | --- | --- | --- |
| A-1, modified raw material | HS420P | Japan Polyethylene Corp. | Novatec | HDPE | 0.4 | 0.955 |
| A-2, modified raw material | HS430P | Japan Polyethylene Corp. | Novatec | HDPE | 0.8 | 0.955 |
| B-1 | UF230 | Japan Polyethylene Corp. | Novatec | LLDPE | 1 | 0.921 |
| B-2 | SF720 | Japan Polyethylene Corp. | Novatec | LLDPE | 0.8 | 0.928 |
| B-3 | HD320 | Japan Polyethylene Corp. | Novatec | HDPE | 0.3 | 0.949 |
| C-1 | NF444N | Japan Polyethylene Corp. | Harmorex | m-LLDPE | 2 | 0.912 |
| C-2 | NF464N | Japan Polyethylene Corp. | Harmorex | m-LLDPE | 2 | 0.918 |
| D-1 | UF230 | Japan Polyethylene Corp. | Novatec | LLDPE | 1 | 0.921 |
| D-2 | HD320 | Japan Polyethylene Corp. | Novatec | HDPE | 0.3 | 0.949 |
| D-3 | UJ370 | Japan Polyethylene Corp. | Novatec | LLDPE | 16 | 0.921 |

(5) Electroconductive Fillers

The electroconductive fillers (E-1) to (E-4) described in Table 2 were used as electroconductive fillers. The BET specific surface area of each electroconductive filler is also shown in Table 2.

TABLE 2

| Symbol | Grade | Manufacturer | Trade name | BET specific surface area ($m^2/g$) |
|---|---|---|---|---|
| E-1 | EC-300J | Lion Corp. | Ketjen Black | 800 |
| E-2 | 350G | TIMCAL | ENSACO | 770 |
| E-3 | 250G | TIMCAL | ENSACO | 65 |
| E-4 | #3030B | Mitsubishi Chemical Corp. | Mitsubishi Carbon Black | 30 |

III. Production of Electroconductive Polyethylene Resin Compositions and Results of Property Evaluation Example 1

Polar-group-containing polyethylene resin (A-1) and polyethylene resin (B-2) were blended by means of a Henschel mixer so that the proportion of the resin (A-1) was 28 wt % and that of the resin (B-2) was 72 wt %, and this resin component was melt-kneaded using a corotating twin-screw kneading machine (TEX30α, manufactured by the Japan Steel Works, Ltd.; screw diameter, 32 mm; L/D=44) in which the kneading temperature and the screw rotation speed had been set at 240° C. and 500 rpm, respectively. This twin-screw kneading machine was equipped with a side feeder (of the type performing side feeding by the action of the corotating twin screws) disposed around the middle of the kneading zone thereof. Electroconductive filler (E-1) was introduced into the kneader with the side feeder which had been regulated so that the electroconductive filler (E-1) was introduced at a rate of 11.1 part by weight per 100 parts by weight of the total amount of the resin component. The melt kneading was further continued to thereby mix the resin component with the electroconductive filler. The molten resin was extruded into a strand, cooled by passing the strand through a cooling water tank, and then pelletized, thereby producing pellets of an electroconductive polyethylene resin composition. The recipe of the composition and the results of evaluation of the properties are shown in Table 3.

Examples 2 to 36 and Comparative Examples 1 to 7

Resin compositions of Examples 2 to 36 and Comparative Examples 1 to 7 were produced in the same manner as in Example 1, except that the kinds and proportions of the polar-group-containing polyethylene resin, the other polyethylene resin, and the electroconductive filler were changed as shown in Table 3 to Table 5. The results of evaluation of the properties are shown in Table 3 to Table 5.

TABLE 3

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Electro-conductive filler | E-1 | parts by weight | 11.1 | 11.1 | 8.7 | 9.9 | 12.4 | 13.6 | 16.1 | 11.1 | 11.1 | 11.1 |
| | E-2 | | | | | | | | | | | |
| | E-3 | | | | | | | | | | | |
| | E-4 | | | | | | | | | | | |
| Resin | A-1 | wt % | 28 | 28 | 28 | 28 | 28 | 28 | 28 | 15 | | |
| | A-2 | | | | | | | | | | 50 | 40 |
| | B-1 | | | | 72 | 72 | 72 | 72 | 72 | 72 | 85 | 30 | 30 |
| | B-2 | | 72 | | | | | | | | | |
| | B-3 | | | | | | | | | | 20 | 30 |
| HL-MFR | | g/10 min | 6.1 | 11.8 | 16.0 | 14.0 | 11.8 | 9.1 | 7.3 | 13.2 | 7.9 | 7.4 |
| Density | | $g/cm^3$ | 0.980 | 0.977 | 0.965 | 0.970 | 0.981 | 0.984 | 0.988 | 0.970 | 0.989 | 0.988 |
| Charpy impact strength | | $kJ/m^2$ | 4.3 | 4.8 | 5.5 | 5.2 | 4.6 | 4.3 | 3.5 | 5.3 | 3.7 | 3.6 |
| Tensile yield strength | | MPa | 21 | 16 | 16 | 16 | 16 | 16 | 17 | 15 | 22 | 22 |
| Tensile elongation at rupture | | % | 700 | 1020 | 1010 | 990 | 940 | 830 | 560 | 1040 | 670 | 690 |
| Melting point | | ° C. | 127 | 126 | 126 | 126 | 126 | 126 | 125 | 124 | 128 | 128 |
| Surface resistivity | | Ω/□ | 4.1.E+06 | 2.6.E+07 | 4.9.E+06 | 1.1.E+07 | 6.6.E+06 | 5.5.E+06 | 1.0.E+07 | 3.0.E+06 | 5.1.E+06 | 3.2.E+06 |
| Adhesive strength | | N/mm | 18 | 21 | 23 | 23 | 20 | 20 | 18 | 24 | 16 | 15 |

| | | | Example 11 | Comparative Example 1 | Comparative Example 2 | Comparative Example 3 | Comparative Example 4 | Comparative Example 5 | Comparative Example 6 |
|---|---|---|---|---|---|---|---|---|---|
| Electro-conductive filler | E-1 | parts by weight | | 11.1 | 11.1 | 5.0 | | 11.1 | |
| | E-2 | | 11.1 | | | | | | |
| | E-3 | | | | | | 11.1 | | |
| | E-4 | | | | | | | | 11.1 |
| Resin | A-1 | wt % | 28 | | | 28 | 28 | | 28 |
| | A-2 | | | 100 | 85 | | | | |
| | B-1 | | 72 | | 15 | 72 | 72 | 72 | 72 |
| | B-2 | | | | | | | | |
| | B-3 | | | | | | | 28 | |
| HL-MFR | | g/10 min | 12.0 | 2.8 | 3.5 | 20.0 | 16.0 | 16.4 | 22.0 |
| Density | | $g/cm^3$ | 0.981 | 0.997 | 0.986 | 0.943 | 0.981 | 0.975 | 0.982 |
| Charpy impact strength | | $kJ/m^2$ | 5 | 1.5 | 2.2 | 7 | 7.5 | 4.4 | 6.8 |

TABLE 3-continued

|  |  |  |  |  |  |  |  |  |
|---|---|---|---|---|---|---|---|---|
| Tensile yield strength | MPa | 16 | 32 | 25 | 14 | 14 | 17 | 14 |
| Tensile elongation at rupture | % | 1010 | 120 | 170 | 1020 | 1010 | 910 | 980 |
| Melting point | °C. | 126 | 131 | 129 | 126 | 126 | 126 | 126 |
| Surface resistivity | Ω/□ | 4.4.E+07 | 7.2.E+06 | 9.0.E+06 | 4.1.E+16 | 4.4.E+16 | 1.1.E+06 | 9.1.E+16 |
| Adhesive strength | N/mm | 20 | 7 | 12 | 24 | 20 | 0 | 20 |

TABLE 4

|  |  |  | Example 12 | Example 13 | Example 14 | Example 15 | Example 16 | Example 17 | Example 18 | Example 19 |
|---|---|---|---|---|---|---|---|---|---|---|
| Electro-conductive filler | E-1 | parts by weight | 8.7 | 9.9 | 11.1 | 12.4 | 11.1 | 12.4 | 11.1 | 8.7 |
| Resin | A-1 | wt % | 28 | 28 | 28 | 28 | 28 | 28 | 28 |  |
|  | A-2 |  |  |  |  |  |  |  |  | 50 |
|  | C-1 |  | 15 | 15 | 15 | 15 | 30 | 30 | 45 | 30 |
|  | C-2 |  |  |  |  |  |  |  |  |  |
|  | D-1 |  | 57 | 57 | 57 | 57 | 42 | 42 | 27 |  |
|  | D-2 |  |  |  |  |  |  |  |  | 20 |
| HL-MFR |  | g/10 min | 11.4 | 10.3 | 8.9 | 8.0 | 9.6 | 8.2 | 9.8 | 10.3 |
| Density |  | g/cm$^3$ | 0.962 | 0.968 | 0.971 | 0.972 | 0.968 | 0.970 | 0.964 | 0.977 |
| Charpy impact strength |  | kJ/m$^2$ | 6.0 | 5.2 | 4.7 | 4.5 | 5.2 | 4.6 | 4.8 | 4.4 |
| Tensile yield strength |  | MPa | 14.3 | 14.2 | 15.0 | 14.9 | 13.4 | 14.3 | 13.3 | 19.6 |
| Tensile elongation at rupture |  | % | 740 | 700 | 580 | 630 | 730 | 640 | 700 | 740 |
| Melting point |  | °C. | 126 | 126 | 126 | 125 | 124 | 124 | 123 | 127 |
| FNCT at 4.9 MPa |  | hr | >1000 | >1000 | >1000 | >1000 | >1000 | >1000 | >1000 | >1000 |
| Surface resistivity |  | Ω/□ | 3.1E+07 | 2.0E+06 | 2.5E+06 | 2.4E+06 | 2.1E+06 | 2.5E+06 | 3.4E+06 | 1.4E+08 |
| Adhesive strength |  | N/mm | 23 | 20 | 21 | 20 | 22 | 20 | 24 | 17 |

|  |  |  | Example 20 | Example 21 | Example 22 | Example 23 | Example 24 | Example 25 | Example 26 | Example 27 |
|---|---|---|---|---|---|---|---|---|---|---|
| Electro-conductive filler | E-1 | parts by weight | 9.9 | 11.1 | 12.4 | 11.1 | 11.1 | 11.1 | 11.1 | 12.4 |
| Resin | A-1 | wt % |  |  |  |  |  |  |  |  |
|  | A-2 |  | 50 | 50 | 50 | 50 | 40 | 30 |  |  |
|  | C-1 |  | 30 | 30 | 30 |  |  |  |  |  |
|  | C-2 |  |  |  |  | 30 | 30 | 30 | 30 | 30 |
|  | D-1 |  |  |  |  |  |  |  |  |  |
|  | D-2 |  | 20 | 20 | 20 | 20 | 30 | 40 | 30 | 30 |
| HL-MFR |  | g/10 min | 9.3 | 7.9 | 6.8 | 7.2 | 7.4 | 7.0 | 5.8 | 5.0 |
| Density |  | g/cm$^3$ | 0.981 | 0.987 | 0.992 | 0.988 | 0.987 | 0.986 | 0.988 | 0.994 |
| Charpy impact strength |  | kJ/m$^2$ | 4.2 | 4.0 | 4.1 | 4.0 | 3.9 | 4.1 | 3.9 | 4.1 |
| Tensile yield strength |  | MPa | 21.6 | 22.7 | 22.6 | 23.8 | 22.5 | 22.4 | 21.7 | 22.1 |
| Tensile elongation at rupture |  | % | 690 | 650 | 660 | 720 | 680 | 630 | 650 | 490 |
| Melting point |  | °C. | 127 | 127 | 127 | 127 | 126 | 124 | 126 | 126 |
| FNCT at 4.9 MPa |  | hr | >1000 | 650 | 400 | 320 | 790 | >1000 | >1000 | >1000 |
| Surface resistivity |  | Ω/□ | 2.1E+06 | 3.1E+06 | 3.4E+06 | 2.8E+06 | 4.2E+06 | 1.9E+06 | 5.7E+06 | 1.6E+06 |
| Adhesive strength |  | N/mm | 15 | 16 | 14 | 15 | 16 | 15 | 17 | 18 |

TABLE 5

|  |  |  | Example 28 | Example 29 | Example 30 | Example 31 | Example 32 | Example 33 | Example 34 | Example 35 | Example 36 | Comparative Example 7 |
|---|---|---|---|---|---|---|---|---|---|---|---|---|
| Electro-conductive filler | E-1 | parts by weight |  |  |  |  |  |  | 11.1 | 8.7 | 7.4 | 5 |
|  | E-2 |  | 11.1 | 12.4 | 13.6 |  |  |  |  |  |  |  |
|  | E-3 |  |  |  |  | 21 | 23.46 | 25.93 |  |  |  |  |
| Resin | A-1 | wt % | 40 | 40 | 40 | 40 | 40 | 40 | 28 | 28 | 28 | 28 |
|  | C-1 |  |  |  |  |  |  |  |  |  |  | 30 |
|  | C-2 |  | 30 | 30 | 30 | 30 | 30 | 30 |  |  |  |  |
|  | D-1 |  |  |  |  |  |  |  | 57 | 57 | 57 | 42 |
|  | D-2 |  | 30 | 30 | 30 | 30 | 30 | 30 |  |  |  |  |
|  | D-3 |  |  |  |  |  |  |  | 15 | 15 | 15 |  |

TABLE 5-continued

|  |  | Example 28 | Example 29 | Example 30 | Example 31 | Example 32 | Example 33 | Example 34 | Example 35 | Example 36 | Comparative Example 7 |
|---|---|---|---|---|---|---|---|---|---|---|---|
| HL-MFR | g/10 min | 6.4 | 6.4 | 6.0 | 5.7 | 6.6 | 7.5 | 12.3 | 17.1 | 20.8 | 19.0 |
| Density | g/cm$^3$ | 0.988 | 0.991 | 0.995 | 1.028 | 1.037 | 1.048 | 0.970 | 0.966 | 0.951 | 0.942 |
| Charpy impact strength | kJ/m$^2$ | 3.8 | 3.6 | 3 | 3.7 | 3.9 | 3.7 | 4.2 | 5.2 | 6.8 | N.B |
| Tensile yield strength | MPa | 22.1 | 22.1 | 21 | 22.5 | 23.03 | 23.6 | 20.9 | 16.1 | 14.1 | 13.3 |
| Tensile elongation at rupture | % | 560 | 630 | 510 | 514 | 463 | 321 | 700 | 980 | 1010 | 980 |
| Melting point | °C. | 128 | 127 | 127 | 129 | 128 | 127 | 126 | 126 | 126 | 124 |
| FNCT at 4.9 MPa | hr | >1000 | 800 | 530 | 310 | 250 | 200 | 0.1 | 0.8 | 2 | >1000 |
| Surface resistivity | Ω/□ | 9.4E+05 | 9.1E+05 | 9.7E+05 | 1.3E+06 | 1.1E+06 | 1.1E+06 | 8.2E+06 | 4.9E+06 | 5.3E+07 | 7.5E+16 |
| Adhesive strength | N/mm | 18 | 16 | 15 | 19 | 19 | 18 | 18 | 22 | 22 | 23 |

IV. Evaluation Results

Example 1 to Example 36 are electroconductive polyethylene resin compositions which satisfy the constituent requirements according to the invention and which not only exhibit high electrical conductivity and adhesiveness but also combine excellent flowability, rigidity, elongation at rupture, and impact resistance.

Comparative Example 1 is a resin composition which includes a polar-group-containing polyethylene resin (A) and an electroconductive filler (E) only and into which no polyethylene resin (B) has been incorporated. This composition is low in Charpy impact strength and tensile elongation at rupture and is low also in adhesive strength.

Comparative Example 2 is a resin composition in which a polyethylene resin (B) has been added in an amount of 15 wt % relative to 85 wt % polar-group-containing polyethylene resin (A). This resin composition is low in Charpy impact strength, tensile elongation at rupture, and adhesive strength.

Comparative Example 3 is a resin composition in which an electroconductive filler (E) has been added in an amount of 5 parts by weight per 100 parts by weight of the sum of the polar-group-containing polyethylene resin (A) and the polyethylene resin (B). This composition has a high surface resistivity and hence does not exhibit sufficient electrical conductivity.

Comparative Example 4 is a resin composition in which an electroconductive filler (E) has been added in an amount of 11.1 part by weight per 100 parts by weight of the sum of the polar-group-containing polyethylene resin (A) and the polyethylene resin (B). This composition has a high surface resistivity and hence does not exhibit sufficient electrical conductivity.

Comparative Example 5 is a resin composition into which no polar-group-containing polyethylene resin (A) has been incorporated and which includes a polyethylene resin (B) and an electroconductive filler (E) only. Since no polar-group-containing polyethylene resin (A) has been incorporated, this composition has no adhesiveness to the SUS at all.

Of the Examples, Example 12 to Example 36 are electroconductive polyethylene resin compositions which satisfy the constituent requirements according to the invention and which not only exhibit high electrical conductivity and adhesiveness but also combine high creep resistance and excellent flowability, rigidity, elongation at rupture, and impact resistance.

The satisfactory results of the Examples shown above and comparisons between the Examples and the Comparative Examples have clearly demonstrated the significance and rationality of the configurations of the present invention (characterizing features of the invention) and the superiority thereof over the prior-art techniques.

While the invention has been described in detail and with reference to specific embodiments thereof, it will be apparent to one skilled in the art that various changes and modifications can be made therein without departing from the spirit and scope thereof. This application is based on a Japanese patent application filed on Oct. 30, 2013 (Application No. 2013-225663) and a Japanese patent application filed on Mar. 3, 2014 (Application No. 2014-040582), the contents thereof being incorporated herein by reference.

INDUSTRIAL APPLICABILITY

According to the invention, it has become possible to produce an electroconductive polyethylene resin which has a balanced combination of high adhesiveness, flowability, rigidity, elongation at rupture, and impact resistance even when an electroconductive filler has been incorporated thereinto in an amount necessary for imparting sufficient electrical conductivity. The invention has further rendered production of industrially useful laminates possible. Furthermore, in cases when a polyethylene resin produced with a metallocene-based catalyst is further incorporated, not only it is possible to produce an electroconductive polyethylene resin which has a balanced combination of high adhesiveness, creep resistance, flowability, rigidity, tensile elongation at rupture, and impact resistance even when an electroconductive filler has been incorporated thereinto in an amount necessary for imparting sufficient electrical conductivity, but also industrially useful laminates can be produced. The electroconductive polyethylene resin composition which can be produced according to the invention is excellent in terms of electrical conductivity and adhesiveness as well as mechanical property and is applicable as useful multilayered molded objects. This composition laminated to or superposed on various adherends can be extensively utilized in the field of packaging materials and packaging containers, the field of industrial materials such as pipes, tubes, filler necks, fuel tanks, fuel valves, hollow containers, injection-molded articles, and drum cans, the field of civil engineering works including water cut-off materials, the electronic field including members for electronic appliances or domestic electrical appliances, the electrical-wire field including electrical wires and cables, etc., and has exceedingly high industrial usefulness.

The invention claimed is:

1. An electroconductive polyethylene resin composition comprising:
  a resin component comprising
    a polar-group-containing polyethylene resin (A), in which a polyethylene resin is graft-modified with a polar-group-containing monomer and
    a polyethylene resin (B); and
  an electroconductive filler (E) having a BET specific surface area ranging from 50 to 1600 m$^2$/g incorporated into the resin component by 6 to 30 parts by weight to 100 parts by weight in total of the resin component comprising the polar-group-containing polyethylene resin (A) and the polyethylene resin (B),
  wherein the proportions of the polar-group-containing polyethylene resin (A) and the polyethylene resin (B) in the resin component are as follows:
  polar-group-containing polyethylene resin (A): 0.5 to 50 wt%
  polyethylene resin (B): 99.5 to 50 wt%,
  and
  wherein the electroconductive polyethylene resin composition satisfies the following requirement (1):
  (1) surface resistivity: 10 Ω/□ to 10$^{10}$ Ω/□.

2. The electroconductive polyethylene resin composition according to claim 1, which satisfies the following requirements (2) and (3):
  (2) a rupture time, as measured through a full-notch tensile creep test, is 10 hours or longer,
  (3) an adhesive strength is 8 N/mm or higher.

3. The electroconductive polyethylene resin composition according to claim 1, wherein the polyethylene resin (B) comprises a polyethylene resin (C) produced by polymerization using a metallocene-based catalyst and a further polyethylene resin (D).

4. The electroconductive polyethylene resin composition according to claim 1, wherein the resin component comprising a polar-group-containing polyethylene resin (A) and a polyethylene resin (B) comprises the polar-group-containing polyethylene resin (A), the polyethylene resin (C) produced by polymerization using a metallocene-based catalyst, and the further polyethylene resin (D), and the proportions of the polar-group-containing polyethylene resin (A), the polyethylene resin (C) produced by polymerization using a metallocene-based catalyst, and the other polyethylene resin (D) are as follows:
  polar-group-containing polyethylene resin (A): 0.5 to 50 wt %,
  polyethylene resin (C) produced by polymerization using a metallocene-based catalyst: 5 to 75 wt %, and
  other polyethylene resin (D): 9 to 94.5 wt %.

5. The electroconductive polyethylene resin composition according to claim 1, wherein the electroconductive filler (E) has a BET specific surface area of 500 m$^2$/g to 1,600 m$^2$/g.

6. The electroconductive polyethylene resin composition according to claim 1, wherein the polar group contained in the polar-group-containing polyethylene resin (A) is at least one selected from the group consisting of carboxyl group, dicarboxylic acid anhydride group, amino group, ester group, silanol group and glycidyl group.

7. The electroconductive polyethylene resin composition according to claim 1, wherein the polar-group-containing polyethylene resin (A) satisfies the following requirements (A1) and (A2):
  (A1) melt flow rate (MFR) measured at a temperature of 190° C. under a load of 2.16 kg: 0.01 g/min to 100 g/min, and
  (A2) density: 0.860 g/cm$^3$ to 0.970 g/cm$^3$.

8. The electroconductive polyethylene resin composition according to claim 3, wherein the polyethylene resin (C) produced with a metallocene-based catalyst satisfies the following requirements (C1) to (C3):
  (C1) melt flow rate (MFR) measured at a temperature of 190° C. under a load of 2.16 kg: 0.01 g/min to 50 g/min,
  (C2) density: 0.860 g/cm$^3$ to 0.930 g/cm$^3$, and
  (C3) molecular-weight distribution parameter of the weight average molecular weight to the number average molecular weight (Mw/Mn): 1.0 to 4.0.

9. The electroconductive polyethylene resin composition according to claim 1, which satisfies the following requirement (4):
  (4) high-load melt flow rate (HL-MFR) measured at a temperature of 190° C. under a load of 21.6 kg: 1.0 to 100 g/min.

10. The electroconductive polyethylene resin composition according to claim 1, which satisfies the following requirement (5):
  (5) density: 0.930 to 1.150 g/cm$^3$.

11. A molded article obtained by molding the electroconductive polyethylene resin composition according to claim 1.

12. A laminate comprising a layer of the electroconductive polyethylene resin composition according to claim 1 and an adherend layer.

13. The molded article according to claim 11, which is a non-charging molded article.

14. The laminate according to claim 12, which is a non-charging laminate.

15. The electroconductive polyethylene resin composition according to claim 1, comprising 6 to 11.1 parts by weight of the electroconductive filler (E), to 100 parts by weight in total of the resin component comprising the polar-group-containing polyethylene resin (A) and the polyethylene resin (B).

16. The electroconductive polyethylene resin composition according to claim 1, comprising 6 to 9.9 parts by weight of the electroconductive filler (E), to 100 parts by weight in total of the resin component comprising the polar-group-containing polyethylene resin (A) and the polyethylene resin (B).

* * * * *